United States Patent
Miller et al.

(10) Patent No.: US 6,406,729 B1
(45) Date of Patent: Jun. 18, 2002

(54) METHOD AND PROCESS FOR PRODUCING AN IMPROVED MILK REPLACER

(75) Inventors: Bill L. Miller, Fort Dodge, IA (US); Mary R. Higgins, Fridley; Paul Casey, New Brighton, both of MN (US)

(73) Assignee: Land O'Lakes, Inc., Arden Hills, MI (US)

(*) Notice: Subject to any disclaimer, the term of this patent is extended or adjusted under 35 U.S.C. 154(b) by 0 days.

(21) Appl. No.: 09/550,389

(22) Filed: Apr. 14, 2000

(51) Int. Cl.⁷ ................................................ A23C 9/16
(52) U.S. Cl. ..................... 426/285; 426/96; 426/289; 426/293; 426/302; 426/443; 426/453; 426/588; 426/807
(58) Field of Search ................................ 426/285, 588, 426/443, 289, 293, 302, 519, 453, 630, 623, 807, 96

(56) References Cited

U.S. PATENT DOCUMENTS

| | | | | |
|---|---|---|---|---|
| 891,336 A | * | 6/1908 | Hatmaker | 426/801 |
| 2,835,586 A | * | 5/1958 | Peebles | 426/453 |
| 3,080,235 A | * | 3/1963 | Hodson | 426/453 |
| 3,083,099 A | * | 3/1963 | Swanson | 426/453 |

(List continued on next page.)

FOREIGN PATENT DOCUMENTS

GB 753600 7/1956

OTHER PUBLICATIONS

From Troublesome Powders to Free–Flowing Dust–Free Granules [online], 1998 or earlier [retrieved on Apr. 3, 1998], retrieved from the Internet:<URL:http://www.hosokawamicron.com/ACHEMA97.HTM>, 1 page.
ADM Distilled Monoglycerides [online], 1998 or earlier, [retrieved on Aug. 10, 1998],retrieved from the Internet:<URL:http://www.foodexplorer.com/product/apps/newprod/FF09668b.HTM>, 1 page.
ICI Surfactants to Feature New Line of Dispersants at Paint & Coatings Expo [online], Sep. 14, 1998 [retrieved on Mar. 19, 1999], retrieved from the Internet:<URL:http://www.surfactant.com/WhatsNewIndustr.html>, 3 pages.
Industrial Specialties Surfactants [online], 1997 [retrieved on Mar. 19, 1999], retrieved from the Internet:<URL:http://www.icinorthamerica.com/industril.htm>, 3 pages.
Lindsey, Don, Lecithin in Animal Feeds [online], pp. 1–10, LEC–T–05, Central Soya, created Feb., 1997, updated Mar. 19, 1998 [retrieved on May 10, 1999], retrieved from the Internet:<URL:http://www.centralsoya.com>.
The Calf Book: the most important diseases during the first few weeks of life; prevention and teratement including the physiology of birth, nutrition and respiration, pp. 62–71 (Schober Verlags–GMBH 1992).
"Agglomeration Solutions" flyer, 1 page, published prior to Apr. 14, 1999.
van den Brink, G.J.J.; *The Manufacture of Milk Replacer–Alternative Methods*; 4 pages; vol. 3, No. 5 of *The Feed Compounder*; HGM Publications (May, 1983).

*Primary Examiner*—Carolyn Paden
(74) *Attorney, Agent, or Firm*—Kinney & Lange, P.A.

(57) ABSTRACT

A method of producing a milk replacer product that includes creating a pattern of air flow in a mixing zone of a mixer, gravity feeding a powdered nutritional composition into the mixing zone, applying an agglomerating aid to the particles of the powdered nutritional composition in the mixing zone, where the agglomerating aid, in combination with the pattern of air flow, is effective to cause particles of the powdered nutritional composition to stick together and form agglomerates, and drying the agglomerates to form the milk replacer product.

58 Claims, 7 Drawing Sheets

U.S. PATENT DOCUMENTS

| | | | |
|---|---|---|---|
| 3,102,035 A | * 8/1963 | Sanna | 426/453 |
| 3,164,473 A | * 1/1965 | Shields | 426/96 |
| 3,262,788 A | * 7/1966 | Swanson | 426/96 |
| 3,728,127 A | * 4/1973 | Palmer | 99/20 |
| 3,773,519 A | * 11/1973 | Pisecky | 426/99 |
| 3,810,765 A | * 5/1974 | Nagasawa | 426/96 |
| 3,920,857 A | * 11/1975 | Barker | 426/285 |
| 4,021,582 A | * 5/1977 | Hsu | 426/99 |
| 4,070,765 A | 1/1978 | Hovmand et al. | 34/10 |
| 4,310,561 A | 1/1982 | Buddemeyer et al. | 426/601 |
| 4,318,932 A | * 3/1982 | Ewing | 426/285 |
| 4,378,376 A | * 3/1983 | Wagner | 426/41 |
| 4,529,610 A | 7/1985 | Blake et al. | 426/554 |
| 4,565,708 A | 1/1986 | Blake et al. | 426/579 |
| 4,614,653 A | * 9/1986 | Kakade | 426/2 |
| 4,692,338 A | * 9/1987 | Irvine | 426/2 |
| 4,767,217 A | 8/1988 | Van den Brink et al. | 366/168 |
| 4,961,934 A | * 10/1990 | Iwasaki | 426/588 |
| 4,980,181 A | * 12/1990 | Camp | 426/98 |
| 5,110,613 A | 5/1992 | Brown et al. | 426/549 |
| 5,128,167 A | * 7/1992 | DeLaporte | 426/580 |
| 5,264,228 A | * 11/1993 | Pray | 426/285 |
| 5,516,521 A | 5/1996 | Fersch et al. | 424/409 |
| 5,554,400 A | * 9/1996 | Stipp | 426/285 |
| 5,580,593 A | * 12/1996 | Liu | 426/96 |
| 5,786,008 A | * 7/1998 | Humphry | 426/801 |
| 5,795,602 A | * 8/1998 | Craig | 426/2 |
| 5,993,873 A | * 11/1999 | Kuslys | 426/285 |
| 6,287,616 B1 | * 9/2001 | Beeson et al. | 426/285 |

* cited by examiner

METHOD AND PROCESS FOR PRODUCING AN IMPROVED MILK REPLACER

CROSS REFERENCE TO RELATED APPLICATION(S)

None

BACKGROUND OF THE INVENTION

The present invention generally relates to a method and process for producing an improved milk replacer. More particularly, the present invention relates to a method and process for producing a milk replacer with improved physical characteristics, such as enhanced particle strength and fat stability, and improved hydration characteristics.

Calves at birth have underdeveloped stomachs and lack the ability to digest fibrous feeds. The only functional stomach compartment of newborn calves is the abomasum. Thus, newborn calves are fed a liquid diet that, upon ingestion, is naturally channeled directly to the abomasum. Many milk-based feeds will clot in the abomasum with the aid of enzymes, such as rennin and pepsin, that are present in the abomasum. Rapid separation of the clot from liquid whey protein and lactose components of the feed then follows in the abomasum, with subsequent digestion of the clot, liquid whey protein, and lactose components in the duodenum.

Lactose, under the action of lactase, yields galactose and glucose, which produces energy for growth; laying down of muscle and fat; and body temperature maintenance that is necessary for metabolical reactions. The clot, consisting primarily of protein and fat, is broken down in the duodenum by proteases and lipases into amino acids and fatty acids, respectively. Amino acids and fatty acids that are absorbed in the duodenum are used to maintain biological processes, repair tissues, and form blood. Sugars, amino acids and fatty acids in the duodenum also help sustain and build up the microbial population in the newborn calves for proper digestion of a fibrous diet.

It is well known that feeding of newborn calves with milk replacers is an acceptable form of dairy herd management that offers various advantages. For example, milk replacer can save the dairy producer money depending upon the amount of milk replacer substituted for mother's milk in newborn calf nourishment. Milk replacers also permit flexible modification of the nutrient mix fed to newborn calves to supply unique nutrients to newborn calves that are not normally present in whole milk produced by mother cows. Weaning newborn calves off whole milk also frees up the mother cows to perform other dairy-based operations, such as providing milk for human consumption or conversion to more valuable dairy products, such as cheese.

Milk replacers may be in liquid or dry powder form. Powdered milk replacers cost less to transport than liquid milk replacers, which helps to improve the overall efficiency of dairy production. Powdered milk replacers are also less likely to support microbial growth during storage than liquid milk replacers. Powdered milk replacers thus offer various benefits compared to liquid milk replacers.

Milk producers want powdered milk replacers that are stable upon rehydration; undergo little or no fat separation, prior to, during, or after hydration; are easily rehydrated in hot or cold water; have an optimum fat particle size distribution that aids in digestion by the calf; and exhibit little, if any, clumping during storage prior to hydration. To fulfill these desires, milk replacer manufacturers typically seek to obtain the following reconstitution properties in powdered milk replacers: high particle wettability, high dispersability, low sedimentation tendencies, and stability of the fat-in-water emulsion formed upon rehydration.

Wettability refers to the rate at which a particle of powder is surrounded by the rehydration medium and sinks away from the liquid surface. Dispersability is the degree to which the powder particles go into solution, while sedimentation is the degree to which the powder particles precipitate as a solid on the bottom of the mix vessel during or after rehydration. A stable liquid emulsion may be characterized as a homogenous system of two or more immiscible liquids. In a liquid emulsion, one of the liquids is homogeneously dispersed in another of the liquids with the assistance of an emulsifier. The emulsifier helps stabilize the liquid emulsion system. Since powdered milk replacers that contain a fat component must be rehydrated in water prior to use, a stable fat-in-water emulsion is a desired property in milk replacers.

It is challenging to produce powdered milk replacers with an optimum balance of these reconstitution properties since each property may compete with one or more of the other properties. For example, high wettability may result high sedimentation tendencies. Therefore, in pursuit of these optimized reconstitution properties, powdered milk replacers are sometimes agglomerated to modify particle size and enhance rehydration characteristics. Agglomeration is a process in which small particles are fused into larger particles, or agglomerates. The larger particle size that results from agglomeration tends to reduce the tendency of product caking, prior to hydration, and tends to improve rehydration characteristics for component particles of the agglomerate, as compared to the rehydration characteristics for component particles that are not agglomerated.

Current powdered milk replacers, though helping to advance the knowledge base regarding reconstitution properties, have not fully achieved an optimum combination of reconstitution properties. Furthermore, current production techniques for manufacturing powdered milk replacers do not consistently and efficiently produce powdered milk replacers having fully satisfactory reconstitution properties. In addition, equipment currently used to produce powdered milk replacers does not accommodate flexible incorporation of liquid agglomerating aids, such as water, during the agglomeration process. Therefore, an urgent need presently exists for an improved powdered milk replacer that better optimizes the reconstitution properties and more efficiently transfers needed nutrients to newborn calves and for an improved technique of producing powdered milk replacer that is more efficient, flexible, and cost-effective than present dairy industry practice.

BRIEF SUMMARY OF THE INVENTION

The present invention includes a method of producing a milk replacer product that includes creating a pattern of air flow in a mixing zone of a mixer, gravity feeding a powdered nutritional composition into the mixing zone, applying an agglomerating aid to the particles of the powdered nutritional composition in the mixing zone, where the agglomerating aid, in combination with the pattern of air flow, is effective to cause particles of the powdered nutritional composition to stick together and form agglomerates, and drying the agglomerates to form the milk replacer product. The present invention further includes a milk replacer product and a method of agglomerating a powdered nutritional composition to form a milk replacer product.

DETAILED DESCRIPTION

Figure 1:
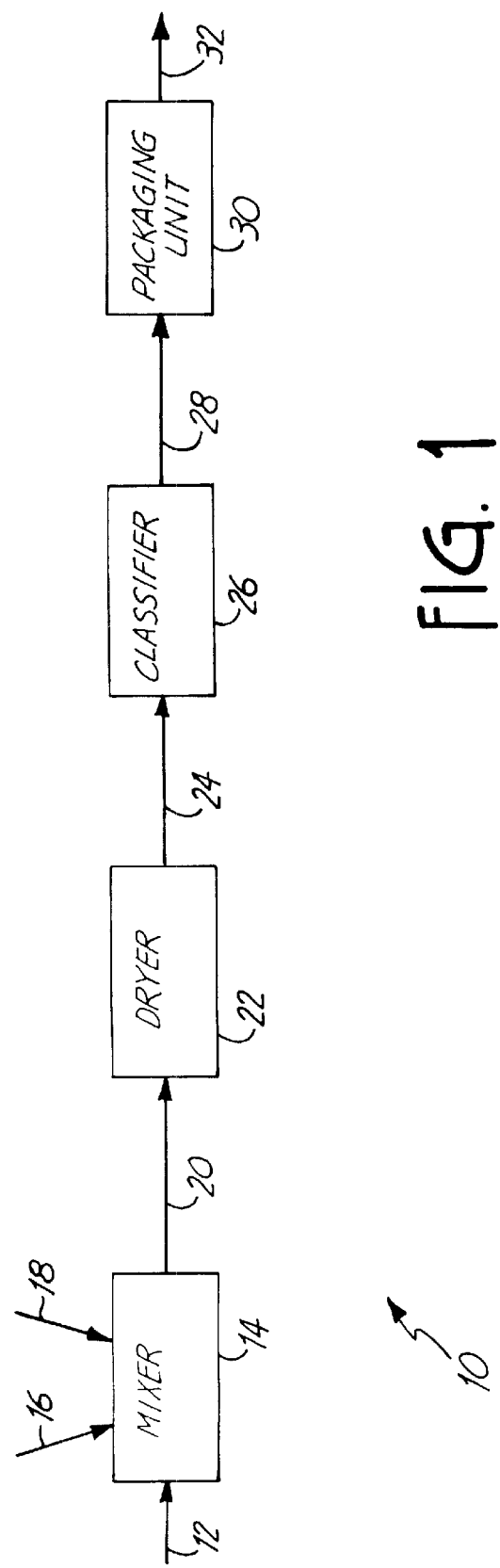
FIG. 1 is a schematic of a process for producing a milk replacer in accordance with the present invention.

A process for producing an improved milk replacer in accordance with the present invention is generally depicted at 10 in FIG. 1. In the process 10, a powdered nutritional composition 12 is introduced into a mixer 14 to agglomerate the powdered nutritional composition 12 and thereby increase the particle size of the powdered nutritional composition 12. One or more agglomerating agent(s) 16 and one or more emulsifying agent(s) 18 may also be introduced into the mixer 14 along with the powdered nutritional composition 12 to facilitate the agglomeration process in the mixer 14. Alternatively, an emulsifying agent may be included as part of the powdered nutritional composition 12 instead of, or in addition to, the emulsifying agent(s) 18 that may be introduced directly into the mixer 14.

The mixer 14, with the aid of the optional agglomerating agent(s) 16 and the optional emulsifying agent(s) 18, transforms the powdered nutritional composition 12 into an agglomerated intermediate 20. The agglomerated intermediate 20 is transferred from the mixer 14 to a dryer 22 to reduce the moisture content of, and optionally cool, the agglomerated intermediate 20, while preferably maintaining the particle shape and size distribution of the agglomerated intermediate 20. A dried agglomerated intermediate 24 is then transferred from the dryer 22 to a classifier 26 to sort the dried agglomerated intermediate 24 according to size and yield a classified milk replacer product 28. The classified milk replacer product 28 is then transferred to a packaging unit 30 that places the classified milk replacer product 28 into packages and discharges a packaged milk replacer product 32.

The powdered nutritional composition 12 may include a variety of different components such as one or more proteinaceous ingredient(s), a fat base, a liquid fat-based blend, one or more dietary additives, and one or more emulsifying agents. The powdered nutritional composition 12 may be supplied as individual components that are subsequently combined, such as by mixing in any conventional mixing apparatus that is capable of uniformly mixing the individual components together, to form the powdered nutritional composition 12; may be supplied in various prepared mixtures of two or more components that are subsequently combined to form the powdered nutritional composition 12; or may be supplied as both individual components and prepared mixtures of two or more components that are subsequently combined to form the powdered nutritional composition 12.

Generally, prior to agglomeration, the concentration of proteinaceous ingredient(s) in the powdered nutritional composition 12 may range from about 20 weight percent to about 90 weight percent, based on the total weight of the powdered nutritional composition 12; the combined concentration of the fat base and of the liquid fat-based blend in the powdered nutritional composition 12 may range from about 10 weight percent to about 90 weight percent, based on the total weight of the powdered nutritional composition 12; and the concentration of the dietary additive(s) in the powdered nutritional composition 12 may range from 0 weight percent up to about 8 weight percent, based on the total weight of the powdered nutritional composition 12.

As indicated previously, emulsifying agent may optionally be included in the powdered nutritional composition 12 in place of, or in addition to, the emulsifying agent(s) 18 that may be introduced into the mixer 14 separately from the powdered nutritional composition 12. The concentration of the emulsifying agent in the powdered nutritional composition 12 may range from 0 weight percent up to about 10 weight percent, based on the total weight of the powdered nutritional composition 12.

The concentration of water in the powdered nutritional composition 12 may range from 0 to about 8 weight percent, based on the total weight of the powdered nutritional composition 12. The primary source(s) of any water in the powdered nutritional composition 12 is the proteinaceous ingredient(s). The concentration of fat in the powdered nutritional composition 12 may range from about 5 weight percent to about 55 weight percent, based on the total weight of the powdered nutritional composition 12. Typically, the source of fat in the powdered nutritional composition 12 is primarily the fat base and/or the liquid fat-based blend.

An example of composition ranges for a preferred formulation of the powdered nutritional composition 12 that is based upon non-soy-based proteinaceous ingredients is presented in Table 1 below, and an example of composition ranges for a preferred formulation of the powdered nutritional composition 12 that is based upon both non-soy-based proteinaceous ingredients and soy-based proteinaceous ingredients is presented in Table 2 below:

TABLE 1

| COMPONENT | Concentration (Weight Percent*) |
| --- | --- |
| Proteinaceous Ingredients | about 56 to about 89 |
| Fat Base | about 15 to about 90 |
| Corn Syrup | 0 to about 5 |
| Water | 0 to about 5 |
| Vitamins/Trace Minerals/Flow Agents/Surfactants | 0 to about 3[#] |

*based on the total weight of the powdered nutritional composition 12
[#]total concentration for all vitamins, trace minerals, flow agents, and surfactants that are included in the powdered nutritional composition 12

TABLE 2

| COMPONENT | Concentration (Weight Percent*) |
| --- | --- |
| Proteinaceous Ingredients (Non-soy-based) | about 20 to about 68 |
| Proteinaceous Ingredients (Soy-based) | about 8 to about 31 |
| Fat Base | about 15 to about 50 |
| Water | about 2 to about 5 |
| Vitamins/Trace Minerals/Flow Agents/Surfactants | 0 to about 3[#] |

*based on the total weight of the powdered nutritional composition 12
[#]total concentration for all vitamins, trace minerals, flow agents, and surfactants that are included in the powdered nutritional composition 12

The agglomerated product of the present invention, such as the agglomerated intermediate 24, is based upon deliberate processing of the powdered nutritional composition 12 to achieve particular properties in the agglomerated product. First, the processing focuses on forming the agglomerated product as relatively large particles, the majority of which have a particle size of about 200 microns or greater. The larger particle size of the agglomerated product, which is substantially or fully retained up until at the time of hydration, helps to enhance the hydration characteristics of the agglomerated product.

The processing in the mixer 14 is accomplished by creating an air flow pattern, or a region of agitated air flow, in a mixing zone of the mixer 14 that is sufficient to toss and disperse particles of the powdered nutritional composition 12 and droplets of the agglomerating agent 16 and permit wetting of the dispersed particles with the agglomerating agent 16. After the air flow pattern (region of agitated air flow) is established in the mixing zone of the mixer 14, the particles of the powdered nutritional composition 12 are introduced into the mixer 14 and allowed to fall, under the action of gravity, into the air flow pattern (region of agitated air flow) of the mixing zone. Droplets of the agglomerating agent 16 are introduced into the mixing zone to wet the particles of the powdered nutritional composition 12.

The wetted particles of the powdered nutritional composition 12 come into contact with each and stick together during formation of the agglomerated product. When the particles of the agglomerated product attain a size and weight that is too large to be sustained by the air flow pattern within the mixer 14, the particles of the agglomerated product fall, under the action of gravity, out of the mixer 14. The mechanical components of the mixer 14 that help to create the air flow pattern (region of agitated air flow) within the mixer 14 are believed to come into contact with few, if any, of the particles being processed or being formed in the mixer 14 and consequently are not believed to cause any shearing or particle size degradation in the mixer 14.

To help ensure that the agglomerated product retains the larger particle size during further processing and storage, the components present in the agglomerated product are securely held in place within the particles of the agglomerated product by a substantially continuous, and preferably a continuous, coating that is laid down both (1) between components in each particle of the agglomerated product and (2) around the exterior of each particle of the agglomerated product. Though the particles of the agglomerated product are not necessarily as large as particles of milk replacer products produced by other methods, the secure retention of the components of the agglomerated product, prior to any selective hydration, assures that the particles of both the agglomerated product and derivatives of the agglomerated product substantially or even fully retain the particle size distribution provided upon initial production of the agglomerated product.

The coating is applied to particles of the powdered nutritional composition 12 within the mixer 14 and is consequently incorporated as part of each particle of the agglomerated product as coated particles of the powdered nutritional composition 12 come into contact with, and stick to, other coated particles of the powdered nutritional composition 12 and uncoated particles of the powdered nutritional composition 12 while advancing through the mixer 14. A majority, and preferably all or predominantly all, particles of the powdered nutritional composition 12 are coated with the coating prior to being incorporated in the agglomerated product. Preferably, particles of the powdered nutritional composition 12 that receive the coating prior to being incorporated in the agglomerated product are substantially, and more preferably fully, encapsulated by the coating prior to being incorporated in the agglomerated product.

Also, additional coating is applied to the particles of the agglomerated product after particles of the powdered nutritional composition 12 have begun sticking together during formation of the agglomerated product. Thus, each particle of the agglomerated product will typically include both internal applications of the coating and external applications of the coating. Consequently, in addition to coating particles of the powdered nutritional composition 12 that are included within each particle of the agglomerated product, the coating also acts as a bridge between adjacent components of the agglomerated product that bridges and fills voids, gaps, and crevices between adjacent particles of the powdered nutritional composition 12 that are included within the particles of the agglomerated product.

Unless otherwise specified, a portion of the coating of a particular particle of the agglomerated product is considered to be an external portion of the coating if the portion of the coating exists about the periphery of the particular particle of the agglomerated product. On the other hand, unless otherwise specified, all portions of the coating of a particular particle of the agglomerated product that are not external portions of the coating are considered to be internal portions of the coating of the agglomerated product.

The coating may typically include water, along with any substances present in the powdered nutritional composition 12, such as any of the proteinaceous ingredients, any of the components of the fat base, any of the components of the liquid fat base blend, any of the components of the dietary additive(s), any of the components of the emulsifying agent portion of the powdered nutritional composition 12, and/or any of the components of the emulsifying agent 18. The coating, by virtue of incorporating these components, is adequate to securely hold the components of the agglomerated product together in each particle of the agglomerated product over long periods of time, until hydration of the particles of the agglomerated product is desired.

The coating is adequate to secure the components of the agglomerated product together in each particle of the agglomerated product even during agitation of the particles, such as during further handling, processing, conveying, or metering of the agglomerated product. Consequently, the coating is adequate to substantially or fully eliminate particle size degradation for the particles of the agglomerated product after formation of the agglomerated product and prior to any desired hydration of the agglomerated product. Furthermore, the combination of the relatively large size of the particles of the agglomerated product along with the presence of the coating greatly minimizes caking of particles of the agglomerated product prior to any desired hydration of the agglomerated product.

The formulation of the coating, though adequate to securely hold the components of the agglomerated product together in each particle of the agglomerated product prior to hydration, is also formulated to support rapid particle hydration and subsequent dispersion of the components of the agglomerated product upon mixing of the agglomerated product with water. Hydration of the agglomerated product along with the emulsifying agent, such as the emulsifying agent included as part of the powdered nutritional composition 12 and/or the emulsifying agent 18 that is included as part of the coating, causes the fat component of the agglomerated product to form a stable fat-in-water dispersion upon hydration of the agglomerated product. The coating applied during formation of the agglomerated product coats fat particles that are released from the agglomerated product upon hydration of the agglomerated product. Since the emulsifier is electrically charged, the coated fat particles repel each other to prevent clumping of the fat particles within the water or aqueous solution. Furthermore, the predominant or full hydration of the particles of the agglomerated product greatly reduces any flocculation or sedimentation of components of the agglomerated product.

There are no particular limits on the particle size distribution or on the particle size of the powdered nutritional composition 12. Nonetheless, the classified milk replacer product 28 preferably has an upper particle size of about 16 mesh to help minimize sedimentation tendencies of the classified milk replacer product 28 upon rehydration, and the classified milk replacer product 28 preferably has a lower particle size of about 140 microns to help maximize wettability tendencies of the classified milk replacer product 28 upon hydration. Therefore, in furtherance of these preferred upper and lower particular sizes of the classified milk replacer product 28, the powdered nutritional composition 12 preferably has an upper particle size of about 200 microns and a lower particle size of about 14 microns. Unless otherwise specified, all designations of mesh size herein are based on the Bureau of Standards Sieve Numbers from the U. S. Standard Sieve Series.

After agglomeration in the mixer 14 and drying in the dryer 22, the concentration of proteinaceous ingredient(s) in the dried agglomerated intermediate 24 may range from about 20 weight percent to about 90 weight percent, based on the total weight of the dried agglomerated intermediate 24; the concentration of fat in the dried agglomerated intermediate 24 may range from about 5 weight percent to about 52 weight percent, based on the total weight of the dried agglomerated intermediate 24; the concentration of the dietary additive in the dried agglomerated intermediate 24 may range from 0 weight percent to about 8 weight percent, based on the total weight of the dried agglomerated intermediate 24; and the concentration of the emulsifying agent {composite of emulsifying agent included as part of the powdered nutritional composition 12 and/or emulsifying agent(s) 18 added to the mixer 14 separately from the powdered nutritional composition 12} in the dried agglomerated intermediate 24 may range from 0 to about 10 weight percent, based on the total weight of the dried agglomerated intermediate 24. Within these general ranges, the weight ratio of the proteinaceous ingredient(s) to the fat to the dietary additive(s) may be set, relative to each other, to meet a particular nutritional regimen for a particular animal, as desired.

The proteinaceous ingredient(s) included as part of the powdered nutritional composition 12 may be derived from animal sources, plant sources, or any combination of animal sources and plant sources. Some examples of suitable animal-derived proteinaceous ingredient(s) that may be incorporated in the powdered nutritional composition 12 include dairy materials, such as whey, whey protein, whey protein concentrate, whey permeate, de-lactosed whey, casein, and dried milk protein; fishmeal, such as fish protein meal; animal fluids, such as blood, components of blood, and subfractions of blood; microbial biomass, such as single cell protein; and any of these in any combination. Some examples of suitable plant-derived proteinaceous ingredient (s) that may be incorporated in the powdered nutritional composition 12 include protein flours and protein-enriched flours derived from grains, such as soybeans, rapeseed, sunflower seeds, wheat, and peanuts; protein flours derived from vegetables, such as potatoes; and any of these in any combination. Some preferred examples of proteinaceous ingredient(s) that may be incorporated in the powdered nutritional composition 12 are whey, whey protein concentrate, protein-modified soy flour, casein, and any of these in any combination. Additionally, blends of amino acids may be incorporated in the powdered nutritional composition 12 to achieve a protein profile in the powdered nutritional composition 12 that is similar to the protein profile present in cow's milk.

The fat base, the liquid fat-based blend, or any combination of the fat base and the liquid fat-based blend serve as the primary energy source in both the powdered nutritional composition 12 and in the packaged milk replacer product 32. The fat base, as well as the liquid fat-based blend, are each generally a mixture of fats that may also contain other non-fat components that provide energy for newborn calves. Some non-exhaustive examples of suitable components of the fat base and of the liquid fat-based blend include animal fat, such as lard, beef tallow, butter, chicken fat, milk fat, sheep fat, and deer fat; vegetable fat, such as soybean oil, safflower oil, oil of evening primrose, marine oil, linseed oil, rapeseed oil, corn oil, rice oil, coconut oil, and castor oil; fatty acids, such as lauric, myristic, palmitic, stearic, arachidonic, palmitoleic, oleic, linoleic, linolenic, and alpha-linolenic acid; sugars, such as glucose, fructose, sucrose, lactose, galactose; corn syrup; starch, such as rice starch, wheat starch, corn starch, tapioca, and potato starch; modified starch, such as acetylated starch, and hydroxy propyl starch; water; proteinaceous ingredient(s), such as any of the proteinaceous ingredients listed above as examples of the proteinaceous ingredient(s) in the powdered nutritional composition 12; emulsifying agent(s); and any of these in any combination.

Some examples of blends that may be incorporated in the fat base in addition to or along with those components listed in the previous paragraph include "7-40-60 whey," "7-40 de-lactosed whey/permeate," "13-60 WPC," "13-60 permeate," "13-60 WPC/whey," and "13-60 WPC/whey permeate." Additional details about these different blends that may be incorporated in the fat base are provided in one or more of Examples 1–10 that are presented later in this document.

As stated above, the fat base and the liquid fat-based blend that may be incorporated in the powdered nutritional composition 12 may include emulsifying agents. A liquid-liquid emulsifying agent is a surface active agent that exhibits some water-solubility and some oil-solubility. Liquid-liquid emulsifying agents contain two different sections, one having a polar or hydrophilic character and the other having a non-polar or hydrophobic character. Liquid-liquid emulsifying agents reduce the interfacial tension between liquid-liquid and air-liquid interfaces, and thus aid stable dispersion of fat globules in a hydrophilic medium.

Consequently, the incorporation of a liquid-liquid emulsifying agent into any fat base and/or any liquid fat-based blend included in the powdered nutritional composition 12 enhances the rehydration properties of the agglomerated product, such as the agglomerated intermediate 20, and derivatives of the agglomerated product, such as the dried agglomerated intermediate 24, the classified milk replacer product 28, and the packaged milk replacer product. Some examples of suitable liquid-liquid emulsifying agent component(s) for the fat base and for the liquid fat-based blend are whey protein concentrates, casein, lecithin, modified lecithin, distilled monoglycerides, distilled diglycerides, polyethylene glycol, propylene glycol, and any of these in any combination.

The fat base is a dry flowable composition, whereas the liquid fat-based blend is a liquid composition. The only compositional differences between the fat base and the liquid fat-based blend are those differences in composition that permit the fat base to be a dry flowable material and those differences that permit the liquid fat-based blend to be a liquid material. The dry fat base is preferred over the liquid fat-based blend because the dry fat base is typically more stable than the liquid fat-based blend during and after agglomeration of the powdered nutritional composition 12 in the mixer 14. The dry fat base is typically more stable than the liquid fat-based blend because dried fat globules are typically more capable of being more fully encapsulated with emulsifying agents and proteins than fat globules present in the liquid fat-based blend. Pre-formulated preparations that include dry fat base, in addition to other components of the powdered nutritional composition 12, are typically more expensive than if dry fat base is supplied separately and then blended with the other components of the powdered nutritional composition 12. Therefore, the preferred dry fat base is preferably supplied as a separate, individually supplied component of the powdered nutritional composition 12.

Some non-exhaustive examples of other dietary additives that may be included in the powdered nutritional composition 12 include organic acids, such as malic, acetic, citric, propionic, and lactic acids that are added to improve the keeping qualities of the rehydrated milk; antibiotics, such as neomycin and Terramycin; soluble fiber from sources such as psyllium, oats, dried brewers' grains, sugar beet pulp, and yeast; vitamins, such as, A, D, E, K, B-complex vitamins, C and B-carotene; minerals such as calcium, phosphorous, magnesium, sodium, potassium, chloride, selenium, copper, iron, manganese, cobalt, zinc, iodine, and sulphur; silicate to help ensure a free flowing powder; immunoglobulins to help improve the resistance of newborn calves to disease; and any combination of any of these dietary additives.

The dietary additives, such as the vitamin and mineral components, are preferably added after the powdered nutritional composition 12 has been agglomerated in the mixer 14, and are more preferably added to the dried agglomerated intermediate 24 after the dryer 22, to minimize any opportunity for degradation of the dietary additives. Also, addition of the dietary additives, downstream of the mixer 14 allows use of the mixer 14 for manufacture of larger batches of the agglomerated intermediate 20 and dried agglomerated intermediate 24 that may later be modified into multiple different specialty blends by addition of different dietary components to the agglomerated intermediate 20 or derivatives thereof.

The agglomerating agent(s) 16 is introduced into the mixer 14 along with the powdered nutritional composition 12 to enhance agglomeration of the particles of the powdered nutritional composition 12. Some examples of suitable agglomerating agent(s) 16 include atomized water, atomized steam, any combination of atomized water and atomized steam, and/or a sugar, solution, such as corn syrup and/or maltodextrins blended with water. Preferably, a combination of atomized water and atomized steam is used as the agglomerating agent 16.

When atomized steam alone is used as the agglomerating agent 16, the dried agglomerated intermediate 24, when rehydrated, exhibits desirable sedimentation properties, such as minimal, if any, particles of sediment in the mixing vessel following rehydration. However, when steam alone is used as the agglomerating agent 16, the rehydrated form of the dried agglomerated intermediate 24 may sometimes exhibit some undesirably high amounts of fat separation. On the other hand, when atomized water alone is used as the agglomerating agent 16, the rehydrated form of the dried agglomerated intermediate 24 desirably exhibits little if any fat separation, whereas the rehydrated form of the dried agglomerated intermediate 24 may sometimes exhibit undesirably elevated sedimentation levels. Surprisingly, however, it has been found that, when atomized steam and atomized water are separately injected into the mixer 14 as the agglomerating agent 16 using different injectors 182, the rehydrated form of the dried agglomerated intermediate 24 desirably exhibits little if any fat separation and exhibits desirable sedimentation properties, such as minimal, if any, particles of sediment in the mixing vessel following rehydration.

It has been discovered that careful agglomeration of the relatively small particles of the powdered nutritional composition 12 in a particular manner permits the agglomerated product to be fully wetted upon rehydration of the agglomerated product. The beneficial agglomeration begins with intimate wetting of all particles of the powdered nutritional composition 12. The wetted particles of the powdered nutritional composition 12 are brought into contact with each other and grown into agglomerates with a select particle size distribution. By following this particular agglomeration procedure, most, if not all, of the surface area of particles making up the agglomerated product is available for wetting, which consequently maximizes rehydration of the agglomerated product. It has also been discovered that: if the particles of the powdered nutritional composition 12 are treated with an emulsifier, either prior to, during, or after agglomeration, the polarity at the surface of the particles is generally increased, and rehydration of the agglomerated product derived from the powdered nutritional composition 12 generally occurs more easily in a hydrophillic medium, such as water.

Figure 2:
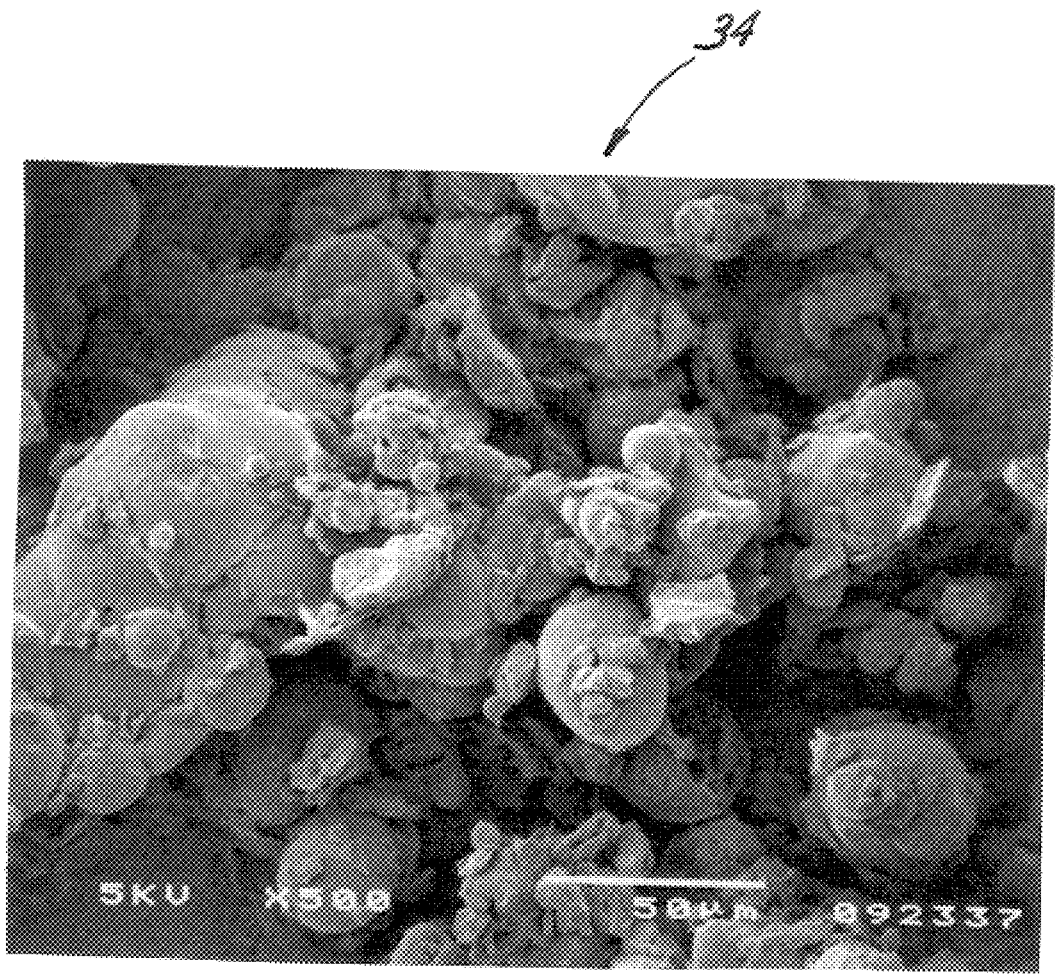
FIG. 2 is a scanning electron micrograph of a powdered nutritional composition that may be used as a feed material in the process of the present invention.

In this regard, particles of the powdered nutritional composition 12 are generally depicted at 34 in FIG. 2. The particles 34 include, among others, particles of fat base and particles of proteinaceous ingredients that are major components of the powdered nutritional composition 12. The vast majority of the particles 34 will pass through a 40 mesh Bureau of Standards sieve. Consequently, the particles 34 are very small and, collectively, appear as a dust or powder. Though some of the particles 34 may be loosely stuck together, the majority of the particles 34 are loose and unattached to any other particles 34. Due to the small size of the particles 34, hydration of (wetting the surface of) the particles 34 would proceed very slowly, if at all. Therefore, the particles 34 require further processing if the particles 34 are to be used as an animal milk replacer.

Figure 3:
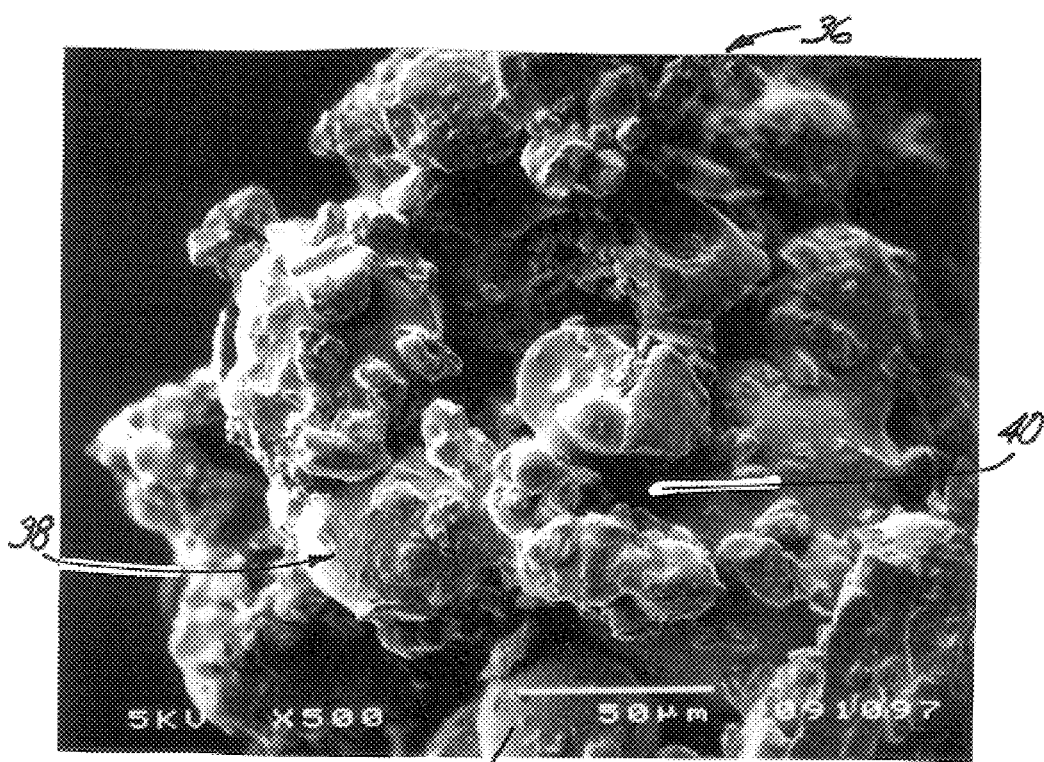
FIG. 3 is a scanning electron micrograph of the powdered nutritional composition depicted in FIG. 2 after processing using a prior art process to form an agglomerated product.

A particle of a milk replacer product formed by processing particles 34 of the powdered nutritional composition 12 in accordance with a prior art process is generally depicted at 36 in FIG. 3. The prior art process entails mechanically contacting and stirring a mixture of the particles 34 and an emulsifying agent. This prior art process employs the emulsifying agent as a binder or coating 38 that connects different particles 34 together to form each particle 36. However, this coating 38 of emulsifying agent in the particle 36 is not uniformly applied to the particles 34 during processing and consequently results in the coating 38 being very discontinuous. This non-uniform and discontinuous nature of the coating 38 is demonstrated by the observation that the majority of the particles 34 that make up the particle 36 are distinctly visible with little rounding or softening of their shapes. Such rounding or softening of the shapes of the particles 34, which is not in fact present, would be evidence of an increased and more continuous application of the coating 38.

The non-uniform and discontinuous nature of the coating 38 causes a number of problems. One major problem is that the particles 34 that make up the particle 36 are not securely held together. Thus, the particles 34 are easily sheared or otherwise separated from the particle 36 during further processing, such as drying, screening, and packaging operations, and during normal handling, such as pouring and metering, in preparation for use. The consequent decrease in size of the particles 36 negatively affects the hydration (wettability) characteristics of milk replacers that are formed of the particles 36. The relatively minimal extent of the coating 38 of the emulsifying agent means that less of the emulsifying agent is associated with individual fat particles. Consequently, upon hydration of the particles 36, there is a tendency for fat particles to exhibit less stability in the dispersion medium with the result that there is a tendency for formation of a substantial separated fat layer in the rehydrated product of the rehydrated particles 36.

Finally, the discontinuous application of the coating 38 leaves many voids, gaps, and crevices 40 between particles 34 that are attached as part of each particle 36. The discontinuous application of the coating 38 thus prevents the coating 38 from bridging voids, gaps, and crevices 40 between most, if not all, adjacent particles 34. The large extent and the large size of these voids, gaps, and crevices 40 illustrate the highly discontinuous nature of the coating 38 within the particles 36. Consequently, the extent and size of these voids, gaps, and crevices 40 within the particles 36 illustrate the incomplete and inadequate application of the coating 38 within the particles 36 by the prior art technique that is used to apply the coating 38. The discontinuous nature of the coating 38, as reflected by the large extent and size of these voids, gaps, and crevices 40 within the particles 36, upon hydration of the particles 36, gives rise to the tendency for formation of a substantial separated fat layer by fat particles in the rehydrated product of the rehydrated particles 36. Likewise, the discontinuous nature of the coating 38, as reflected by the large extent and size of these voids, gaps, and crevices 40 within the particles 36, gives rise to an enhanced caking tendency by the particles 36 due to fat particle separation from the particles 36.

Figure 4:
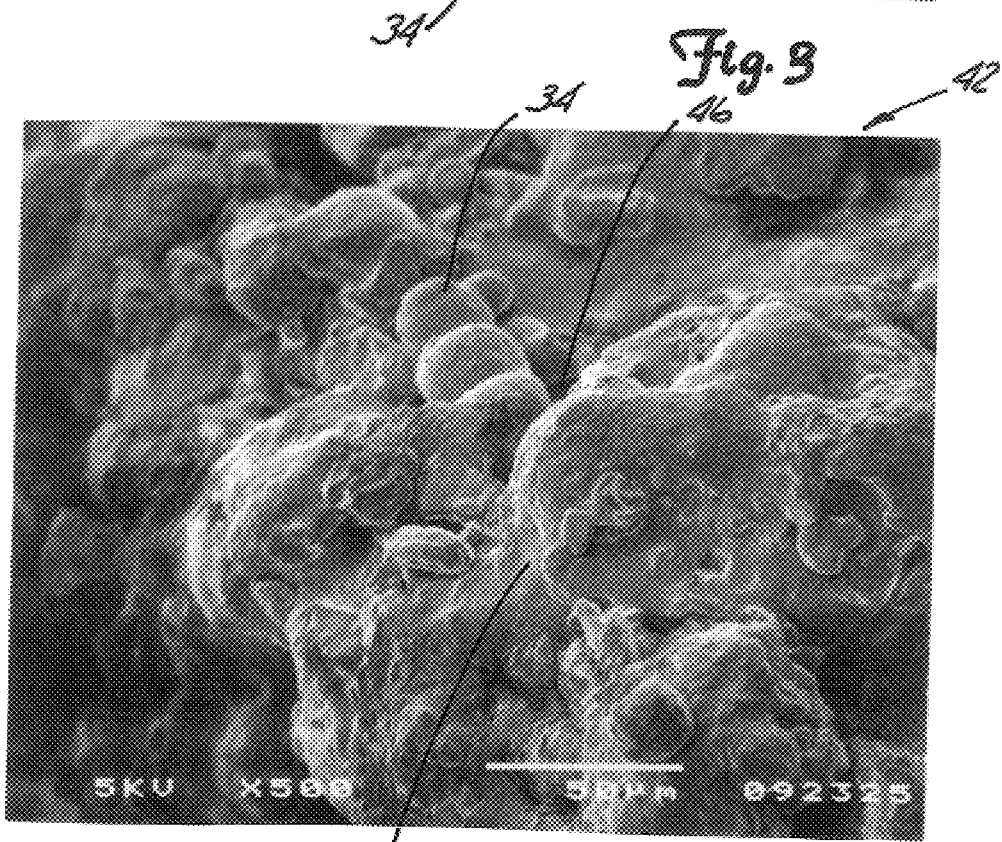
FIG. 4 is a scanning electron micrograph of the powdered nutritional composition depicted in FIG. 2 after processing to form an agglomerated product in accordance with the present invention.

When processed in accordance with the present invention, the particles 34 of the powdered nutritional composition 12 are transformed into agglomerated particles, as generally depicted at 42 in FIG. 4. Processing in accordance with the present invention causes application of a coating 44 between different particles 34 in each of the agglomerated particles 42 and causes application of the coating 44 over the exterior of each agglomerated particle 42. This coating 44 is greatly enhanced in extent and in continuity, as compared to the prior art application of the coating 38. This uniform and continuous nature of the coating 44 is demonstrated by the observation that the majority of the particles 34 that make up the agglomerated particle 42 are obscured, as if being covered by a cloud, and exhibit substantial rounding or softening of their shapes. Such rounding or softening of the shapes of the particles 34 in the agglomerated particles 42 is direct evidence of a substantial and continuous application of the coating 44.

The enhanced extent and continuous nature of the coating 44 is further demonstrated by the greatly diminished extent and presence of voids, gaps, and crevices 46 between different particles 34 of the agglomerated particles 42, as compared to the far greater extent and presence of voids, gaps, and crevices 40 between particles 34 that are attached as part of the particles 36 (not shown in FIG. 4) of the prior art. Consequently, in addition to coating each particle 34 of each agglomerated particle 42, the coating 44 also acts as a bridge between adjacent particles 34 that bridges and fills voids, gaps, and crevices 46 that would otherwise be fully present between adjacent particles 34 in each agglomerated particle 42.

The enhanced extent and continuous nature of the coating 44, as reflected by the minimal extent and size of voids, gaps, and crevices 46 between different particles 34 of the agglomerated particles 42, is thought to explain why milk replacers that are based upon the agglomerated particles 42 exhibit little, if any, caking tendency between different particles 42, during storage and prior to hydration. Specifically, the enhanced extent and continuous nature of the coating 44 is thought to stabilize, securely bind, and encapsulate fat particles within the agglomerated particles 42. With the fat stabilized, securely bound, and encapsulated within the agglomerated particles 42, the fat particles in each individual agglomerated particle 42 are prevented from sticking to other agglomerated particles 42 or to components of other agglomerated particles 42. Thus, the enhanced extent and continuous nature of the coating 44 effectively contains fat particles within the agglomerated particles 42 and thereby greatly minimizes any tendency or opportunity for caking of the agglomerated particles 42.

Preferably, application of the coating 44 in accordance with the present invention substantially fills in at least substantially all of the voids, gaps, and crevices 46. More preferably, application of the coating 44 in accordance with the present invention substantially fills in all, or essentially all, of the voids, gaps, and crevices 46. This filling of the voids, gaps, and crevices 46 with the coating 44 gives the agglomerated particles 42 a more rounded or globular shape.

The coating 44 may typically include water, along with any substances present in the powdered nutritional composition 12, such as any of the proteinaceous ingredients, any of the components of the fat base, any of the components of the liquid fat base blend, any of the components of the dietary additive(s), any of the components of the agglomerating agent 16, any of the components of the emulsifying agent portion of the powdered nutritional composition 12, and/or any of the components of the emulsifying agent 18. The coating 44, by virtue of incorporating these components and by virtue of the enhanced extent and continuous nature of the coating 44, is typically adequate to securely hold the particles 34 of the agglomerated particles 42 together in each particle of the agglomerated product over long periods of time, until hydration of the agglomerated particles 42 is desired.

Thus, the coating 44 effectively acts as a glue that predominantly, if not fully, prevents degradation of the agglomerated particles 42, until use of the agglomerated particles 42 to form of a liquid milk replacer is desired. Indeed, the great extent and continuity of the coating 44 predominantly, if not fully, prevents separation of the particles 34 from the particles 42 during further processing of the agglomerated particles 42, such as drying, screening, and packaging operations, and during normal handling, such as pouring and metering, in preparation for use of the agglomerated particles 42. Maintenance of the particle size distribution of the agglomerated particles 42 using the coating 44 enhances the hydration (wettability) characteristics of milk replacers that are formed of the agglomerated particles 42.

Furthermore, the enhanced association of the coating 44 that incorporates emulsifying agent means that more of the emulsifying agent is associated with individual fat particles of the agglomerated particles 42. Consequently, upon hydration of the agglomerated particles 42, fat particles incorporated in the agglomerated particles 42 tend to exhibit greater stability in the dispersion medium, as compared to fat particles of the particles 36 of the prior art, with the result that there minimal, if any, tendency for formation of a substantial, separated fat layer in the rehydrated product derived from the agglomerated particles 42.

Figure 5:
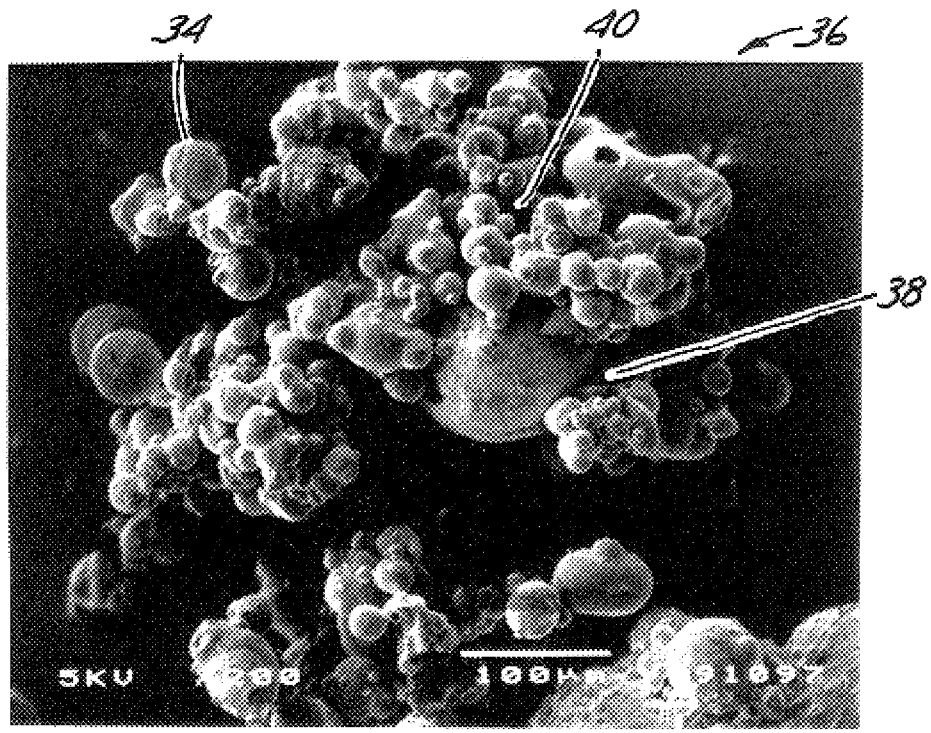
FIG. 5 is a scanning electron micrograph, at reduced magnification, of the powdered nutritional composition depicted in FIG. 2 after processing using a prior art process to form an agglomerated product.

Deficiencies in the coating 38 of particles 36 of milk replacer product formed by processing particles 34 of the powdered nutritional composition 12 in accordance with the prior art process are also readily apparent when the particles 36 are viewed at a lower degree of magnification, as best depicted in FIG. 5. The non-uniform and discontinuous nature of the coating 38 of the particles 36 is again demonstrated by the observation that the majority of the particles 34 that make up the particle 36 are distinctly visible with little rounding or softening of their shapes. Again, the discontinuous nature of the coating 38, as reflected by the large extent and size of the voids, gaps, and crevices 40 within the particles 36, gives rise to an enhanced caking tendency by the particles 36 due to fat separation from the particles 36 during storage and prior to hydration.

Finally, even though the particles 36, as produced, may initially have a larger size than the agglomerated particles 42 that are produced in accordance with the present invention, the inconsistent and minimal application of the coating 38 typically allows the particles 34 to be easily sheared or otherwise separated from the particles 36 during further processing and during normal handling in preparation for use. The consequent decrease in size of the particles 36 negatively affects the hydration (wettability) characteristics of milk replacers that are formed of the particles 36.

Figure 6:
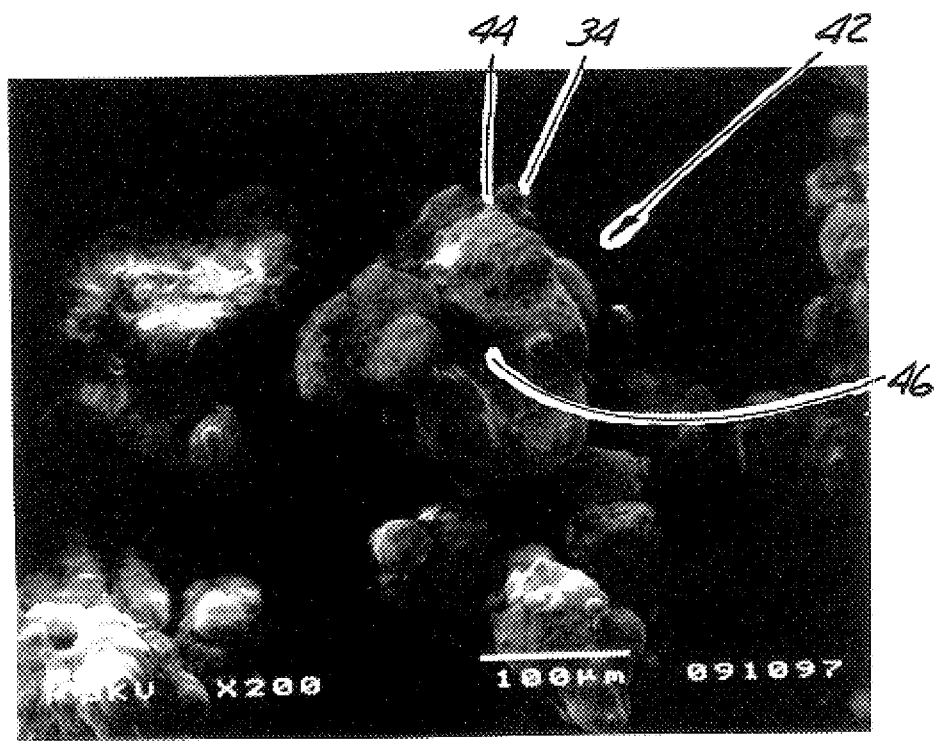
FIG. 6 is a scanning electron micrograph, at reduced magnification, of the powdered nutritional composition depicted in FIG. 2 after processing to form an agglomerated product in accordance with the present invention.

Beneficial aspects of the coating 44 in agglomerated particles 42 of milk replacer product formed by processing particles 34 of the powdered nutritional composition 12 in accordance with the present invention are also readily apparent when the agglomerated particles 42 are viewed at a lower degree of magnification, as best depicted in FIG. 6. The increased extent and continuous nature of the coating 44 in the agglomerated particles 42 is again demonstrated by the observation that the majority of the particles 34 that make up the agglomerated particle 42 are substantially rounded or softened in shape. Again, the large extent of the coating 38 and the continuous application of the coating 38 leaves a minimal number and extent of voids, gaps, and crevices 40 between particles 34 that are attached as part of the particles 42. Otherwise stated, the coating 44 acts as a bridge between adjacent particles 34 that bridges and fills voids, gaps, and crevices 46 that would otherwise be fully present between adjacent particles 34 in each agglomerated particle 42. The enhanced extent and continuous nature of the coating 44, as reflected by the minimal extent and size of voids, gaps, and crevices 46 between different particles 34 of the agglomerated particles 42, is thought to explain why milk replacers that are based upon the agglomerated particles 42 exhibit little, if any, caking tendency between different particles 42, during storage and prior to hydration.

Finally, even though the agglomerated particles 42, as produced, may, but do not necessarily, have a smaller size initially than the particles 36 that are produced in accordance with the prior art process, the large extent and continuous application of the coating 42 minimizes, and even eliminates, at least predominantly, any particle size degradation of the agglomerated particles 42 during further processing and during normal handling in preparation for use. The consequent maintenance of the size of the agglomerated particles 42 enhances the hydration (wettability) characteristics of milk replacers that are formed from the agglomerated particles 42.

The emulsifying agent 18 that may be applied to the powdered nutritional composition 12 in the mixer 14 may generally be supplied in liquid form or in powder form. Instead of, or in addition to, being added to the mixer 14 separately from the powdered nutritional composition 12, the emulsifying agent 18 may also be included in the powdered nutritional composition 12, and/or the emulsifying agent 18 may optionally be included as part of the agglomerating agent 16 that is introduced directly into the mixer 14 separately from the powdered nutritional composition 12.

Some examples of suitable emulsifying agent(s) 18 include lard; lecithin, such as fluid soy lecithin; polyethylene glycol; propylene glycol; ethoxylated monoglycerides of edible $C_{12}$–$C_{24}$ fatty acids; ethoxylated diglycerides of edible $C_{12}$–$C_{24}$ fatty acids; distilled monoglycerides of edible $C_{12}$–$C_{24}$ fatty acids; distilled diglycerides of edible $C_{12}$–$C_{14}$ fatty acids; and any combination of any of these. Monoglycerides and diglycerides are compounds in which one or two hydroxyl groups of glycerol, respectively, have reacted to form ethers or esters. Monoglycerides have one substituent per molecule in place of the hydroxyl group, while diglycerides may have two like substituents or two unlike substituents per molecule in place of two hydroxyl groups. Monoglycerides and diglycerides of edible $C_{12}$–$C_{24}$ fatty acids may be separate, individually supplied components, or may be supplied in various prepared combinations with each other. Distillation of the monoglyceride and diglyceride reaction products removes by-products, such as triglycerides, and unreacted glycerine.

Some examples of suitable emulsifying agent(s) include MONICS blend of distilled monoglycerides and distilled diglycerides that is available from Food Basics of Holland; ADM distilled monoglycerides that are available from Archer Daniels Midland Company of Decatur, Ill.; and deoiled soybean lecithin, such as NUTRIPUR P deoiled, powdered, soybean lecithin that is available from Lucas Meyer Inc. of Decatur, Ill. Another example of a suitable emulsifying agent is the MAXEMUL 210 blend of refined fluid soy lecithin, propylene glycol, ethoxylated monoglycerides and ethoxylated diglycerides that is available from Central Soya Corp. of Fort Wayne, Ind.

One preferred example of the emulsifying agent 18 is a blend containing about 94 weight percent lard and about 6 weight percent lecithin, based on the total weight of the emulsifying agent 18. In this preferred example, the lard is added to reduce the viscosity of the emulsifying agent 18, since the lecithin, standing alone, has a viscosity, even at elevated temperature, that is too high to permit spraying of the lecithin alone.

Another preferred example of the emulsifying agent 18 is a blend containing about 47 weight percent lard, about 3 weight percent lecithin, and about 50 weight percent of the MAXEMUL 210 blend of fluid soy lecithin, propylene glycol, ethoxylated monoglycerides and ethoxylated diglycerides, based on the total weight of the emulsifying agent 18. In this preferred example, the lard is added to reduce the viscosity of the emulsifying agent 18, since the MAXEMUL 210 blend, standing alone, has a viscosity, even at elevated temperature, that is too high to permit spraying of the MAXEMUL 210 blend alone.

Yet another preferred example of the emulsifying agent 18 is a blend containing about 19 weight percent lard, about 1 weight percent lecithin, and about 80 weight percent of the MAXEMUL 210 blend of fluid soy lecithin, propylene glycol, ethoxylated monoglycerides and ethoxylated diglycerides, based on the total weight of the emulsifying agent 18. In this preferred example, the lard is added to reduce the viscosity of the emulsifying agent 18, since the MAXEMUL 210 blend and the lecithin, collectively, have a viscosity, even at elevated temperature, that is too high to permit spraying of the mixture of the lecithin and MAXEMUL 210 blend alone.

One preferred example of the mixer 14, is an agglomerating mixer that is best depicted at 110 in FIG. 7, such as the SCHUGI FLEX-O-MIX™ brand mixer (Model No. FX-160; Bepex ID. No. 961007), that is available from Hosokawa Bepex Corporation of Minneapolis, Minn. Additional details about the agglomerating mixer 110, beyond those provided herein, may be gleaned from U.S. Pat. No. 4,767,217, which is hereby incorporated by reference in its entirety.

The agglomerating mixer 110 has a radial wall 136 that includes radial wall portions 136*a*, 136*b*, 136*c*. The radial wall 136 is centered about a longitudinal axis A of the agglomerating mixer 110. The radial wall portion 136*a* defines a mixing chamber 138. The radial wall portion 136*a* is connected to a discharge chute 39. Agglomerated particles that are produced in the mixing chamber 138 fall, by gravity, out of the mixing chamber 138, through the discharge chute 39, and into the dryer 22 (not shown in FIG. 7). The radial wall portion 136*b* defines a transfer chamber 140. The radial wall portions 136*a*, 136*b* are each equidistant, or approximately equidistant, from the axis A and are therefore each oriented generally parallel to the axis A. Beginning proximate the transfer chamber 140, the radial wall portion 136*c* is angled outward away from the axis A. The agglomerating mixer 110 also has an inlet cap section 142.

The inlet cap section 142 includes a radial wall 144, an end wall 146, and one or more tubular feed ports 148, such as a first tubular feed port 148*a* and a second tubular feed port 148*b* (not shown in FIG. 7). Each tubular feed port 148 has a distal end 150 and a proximal end 152. Each tubular feed port 148 includes a radial wall 154 defining a cylindrical passage 156. The cylindrical passage 156 extends entirely through the tubular feed port 148 from the distal end 150 to the proximal end 152. The proximal end 152 of each tubular feed port 148 is attached to the inlet cap section 142 at the radial wall 144 and at the end wall 146. The inlet cap section 142 and the radial wall portion 136*c* are attached together by a flange 158. The inlet cap section 142, the radial wall portion 136*c*, and the proximal end 152 of the feed port(s) 148 cooperatively define an inlet chamber 160. The transfer chamber 140 is located between and adjacent to the mixing chamber 138 and the inlet chamber 160.

In one preferred embodiment, the agglomerating mixer 110 includes two of the tubular feed ports 148, such as the first tubular feed port 148*a* and the second tubular feed port 148*b*, that are arranged in diametric opposition to one another and are inclined away from the mixing chamber 138 at an acute angle of about 45 degrees with respect to the axis A. The radial wall portion 136*c* is likewise inclined away from the mixing chamber 138 at an acute angle of about 45 degrees with respect to the axis A. The inclined nature of the radial wall portion 136*c* helps direct material introduced into the mixer 110 via the tubular feed port(s) 148, through the transfer chamber 140, and then into the mixing chamber 138.

The agglomerating mixer 110 additionally includes a rotatable mixing shaft 162 that extends along the axis A, through the inlet chamber 160 and into the mixing chamber 138. The mixing shaft 162 has a proximal end 164 that is located within the mixing chamber 138 and a distal end 166 that is located outside of the inlet chamber 160. The distal end 166 of the mixing shaft 162 is rotatably attached to an electric motor 168 and is supported by a bearing assembly 170. The electric motor 168 may be a direct current motor that is capable of rotating the mixing shaft 162 over a range of different speeds. The mixing shaft 162 may generally rotate at between about 1000 and about 4000 revolutions per minute.

The agglomerating mixer 110 additionally includes a plurality of deformation members 172 that are supported by a plurality of carriers 174. Each carrier 174 is biased to maintain the deformation members 172 that are attached to the carrier 174 in engagement with the radial wall portion 136*a*. The agglomerating mixer 110.further includes a plurality of drive mechanisms 176 that cause oscillation of the carriers 174, and the deformation members 172 attached to the carrier 174, in the direction of arrows B, and $B_2$. This oscillation of the deformation members 172 that are engaged with the radial wall portion 136*a* causes deformation of the wall portion 136*a* that is sufficient to minimize caking, if any, of material present in the mixing chamber 138 onto wall portion 136*a* and that is also sufficient to dislodge any material that does stick to the wall portion 136*a* within the mixing chamber 138.

The agglomerating mixer 110 additionally includes a plurality of surfaces 178 (only one of the surfaces 178 is depicted in FIG. 7) that each individually defines a port 180 of the agglomerating mixer 110. A plurality of the ports 180 are included in the agglomerating mixer 110 (only one of the parts 180 is depicted in FIG. 7). Each surface 178 fully extends through the radial wall portion 136*b* proximate the transfer chamber 140. Each port 180 is angularly spaced apart from the other port(s) 180 about the axis A. The angular spacing between each port 180 is approximately the same and more preferably is the same.

An injector 182 is positioned in each of the ports 180. The mixer 14 may include one or more of the injectors 182, as best depicted in FIG. 8, such as a first injector 182*a*, a second injector 182*b*, a third injector 182*c*, and a fourth injector 182*d*. The mixing shaft 162 may be set to rotate in the direction of arrow C about the axis A. The injectors 182*a*, 182*b*, 182*c*, 182*d* are sequentially arranged in the direction of the arrow C about the axis A starting at the first tubular feed port 148*a*. The direction of rotation of the mixing shaft 162 may be set to be in the opposite direction to the direction of arrow C. With this change in the direction of rotation of the mixing shaft 162, the first injector 182*a* and the fourth injector 182*d* would be switched with each other and the second injector 182*b* and the third injector 182*c* would be switched with each other to maintain the sequential arrangement of the injectors 182a, 182b, 182c, 182d about the axis A in the direction of rotation of the mixing shaft 162.

Figure 7:
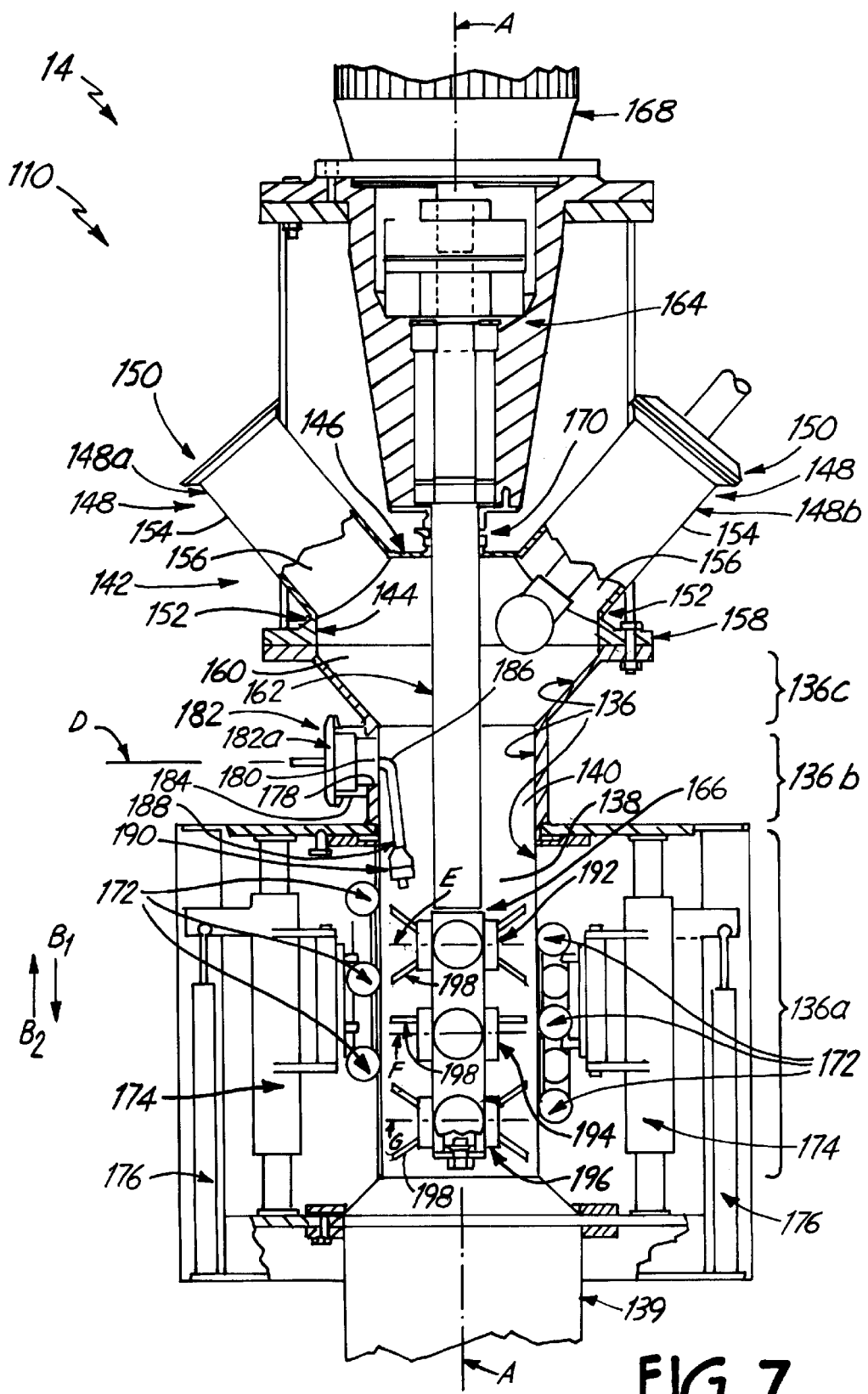
FIG. 7 is a diagrammatic elevational view, partly broken away in section, of a mixer that may be used in the process of the present invention for producing a milk replacer.
Figure 8:
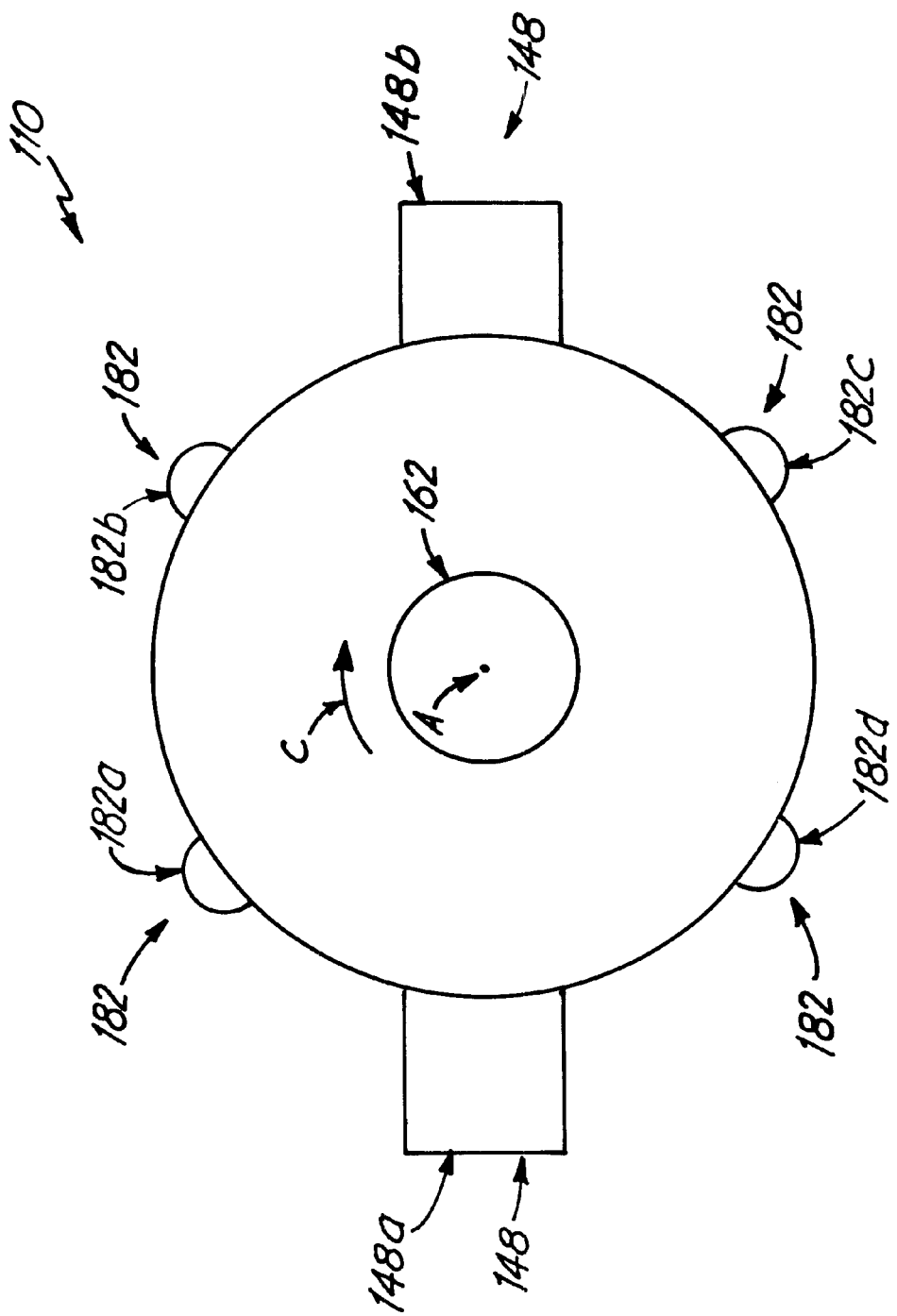
FIG. 8 is a schematic of a portion of the mixer depicted in FIG. 7 showing an arrangement of feed ports and injectors of the mixer in accordance with the present invention.
Figure 9:
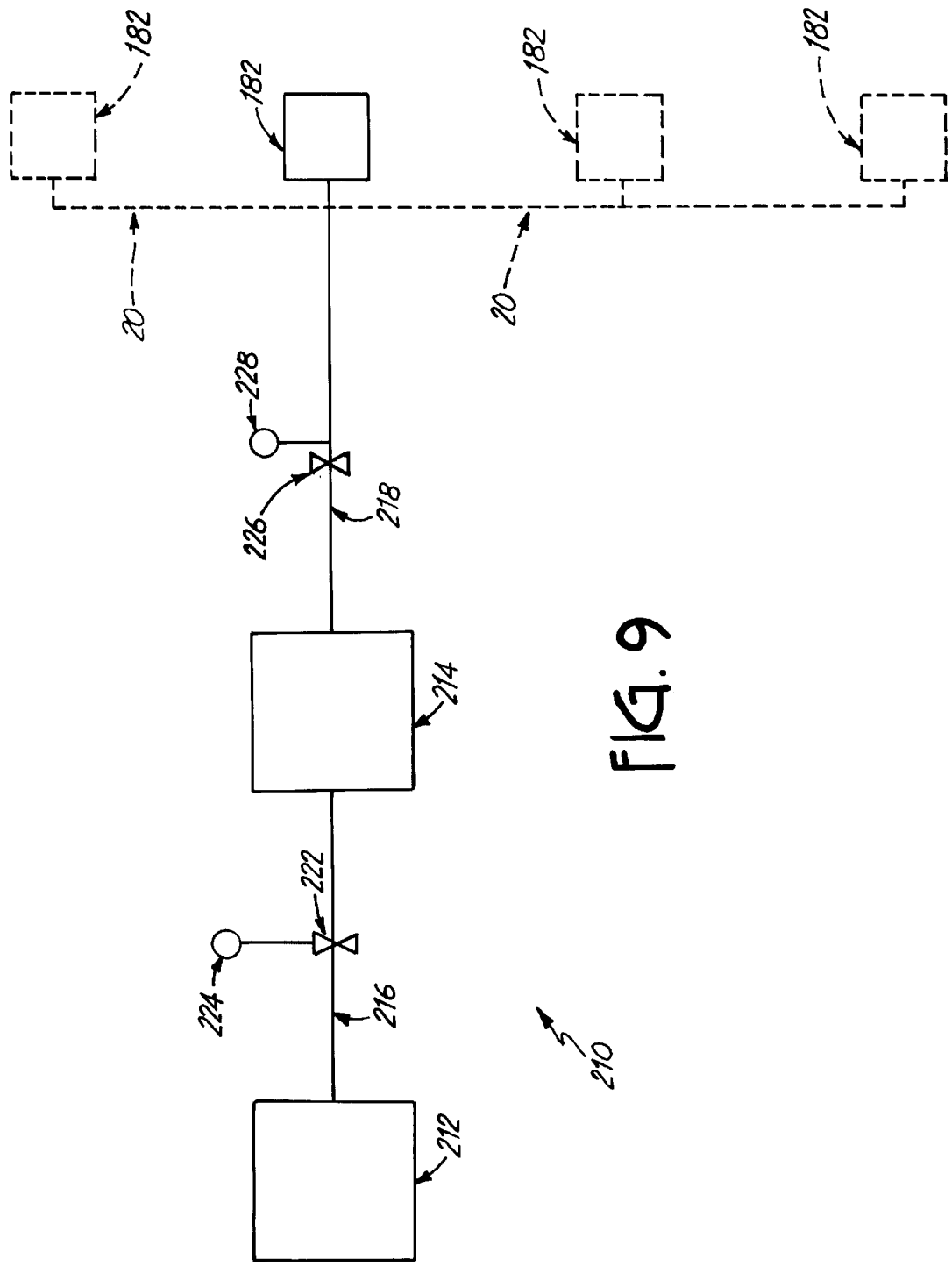
FIG. 9 is a schematic of a system for metering steam to the mixer depicted in FIG. 7 in accordance with the present invention.

Returning to FIG. 7, each injector 182 includes a bend 184, a proximal end 186, and a distal end 188. The bend 184 permits the distal end 188 of each injector 182 to be positioned within the mixing chamber 138. Each injector 182 includes a nozzle head 190 that is attached to the distal end 188 of the injector 182 within the mixing chamber 138. The nozzle heads 190 may be individually selected to control the discharge condition of fluids passed through a particular one of the injectors 182. Alternatively, one or more of the nozzle heads 190 may be selectively adjustable to permit modification of the discharge condition of fluids passed through a particular one of the injectors 182.

Each port 180 includes a longitudinal axis D that extends from outside the agglomerating mixer 110 into the transfer chamber 140. Each injector 182 may be rotated about the axis D of a particular one of the ports 180 to change the direction that fluid discharges from a particular one of the nozzle heads 190 within the mixing chamber 138. The injectors 182 and nozzle heads 190 are adapted to inject droplets of liquids proximate solid particles (not shown) that have been introduced into the mixing chamber 138 to wet the solid particles and assist agglomeration of the wetted solid particles in the mixing chamber 138. For example, the injectors 182 may be rotated about the axes D within the ports 180 to permit liquid injection from the nozzle heads 190 into the mixing chamber 138 to coincide with the direction of the rotation of the mixing shaft 162.

The mixing shaft 162 carries a plurality of blade assemblies 192, 194 and 196. Each blade assembly 192, 194, 196 carries a plurality of knives 198. The blade assembly 192 includes a plane E, the blade assembly 194 includes a plane F, and the blade assembly 196 includes a plane G. The planes E, F, G are each oriented parallel to each other. Additionally, the axis A is perpendicular to each of the planes E, F, G. The knives 198 that are carried by the blade assembly 192 may each be individually and selectively positioned to diverge away from the plane E at any angle ranging from greater than 0° to about 90°. Likewise, the knives 198 that are carried by the blade assembly 194 may each be individually and selectively positioned to diverge away from the plane F at any angle ranging from greater than 0° to about 90°. Similarly, the knives 198 that are carried by the blade assembly 196 may each be individually and selectively positioned to diverge away from the plane G at any angle ranging from greater than 0° to about 90°. Also, the knives 198 that are carried by the blade assembly 192 may each be individually and selectively positioned to be parallel to the plane E, the knives 198 that are carried by the blade assembly 194 may each be individually and selectively positioned to be parallel to the plane F, and the knives 198 that are carried by the blade assembly 196 may each be individually and selectively positioned to be parallel to the plane G.

The blade assemblies 192, 194, 196 are each mounted on the mixing shaft 162. Therefore, the knives 198 each rotate about the axis A when the shaft 162 rotates about the A axis. This rotation of the knives 198 within the mixing chamber 138 creates a pattern of air flow (a region of agitated air) within the mixing chamber 138 that uniformly disperses the powdered nutritional composition 12, the optional agglomerating agent(s) 16, and the optional emulsifying agent (s) 18 within the mixing chamber 138. This air flow that is created by the rotating knives 198 consequently helps maximize uniform mixing of the powdered nutritional composition 12, the optional agglomerating agent(s) 16, and the optional emulsifying agent(s) 18 within the mixing chamber 138 prior to discharge of agglomerated particles having optimized rehydration characteristics.

It has been discovered that the mixer 110 suitably agglomerates the the powdered nutritional composition 12, the optional agglomerating agent(s) 16, and the optional emulsifying agent(s) 18 within the mixing chamber 138 when the knives 198 that are carried by the blade assembly 192 are each individually and selectively positioned to diverge away from the plane E at an angle ranging from greater than 0° to about 10°, when the knives 198 that are carried by the blade assembly 194 are individually and selectively positioned to be parallel to the plane F or to diverge away from the plane F at any angle ranging from greater than 0° to about 10°, and when the knives 198 that are carried by the blade assembly 196 are each individually and selectively positioned to diverge away from the plane G at an angle ranging from greater than 0° to about 10°. As one example, the knives 198 that are carried by the blade assembly 192 may each be individually and selectively positioned to diverge away from the plane E at an angle of about 5°, the knives 198 that are carried by the blade assembly 194 may each be individually and selectively positioned to be parallel to the plane F, and the knives 198 that are carried by the blade assembly 196 may each be individually and selectively positioned to diverge away from the plane G at an angle of about 5°.

As one example of the technique of the present invention, the powdered nutritional composition 12 may be introduced into the mixer 110, such as the SCHUGI FLEX-O-MIX™ mixer (Model No. FX-160; Bepex ID No. 961007), through only one of the tubular feed ports 148, such as the first tubular feed port 148a, at a rate ranging from about 590 to about 680 pounds per hour. After being introduced into the mixer 110, the powdered nutritional composition 12 falls, under the influence of gravity, into the air flow pattern that is created in the mixing chamber 138. The Model No. FX-160 of the SCHUGI FLEX-O-MIX™ mixer is supplied in a range of different operating capacities. For example, one presently available size of the Model No. FX-160 of the SCHUGI FLEX-O-MIX™ mixer is capable of accepting the powdered nutritional composition 12, through only one of the tubular feed ports 148, such as the first tubular feed port 148a, at a rate ranging up to about 2,000 pounds per hour. In general, any conventional apparatus and technique that is suitable for handling dry powdered material, such as silo storage and such as conveyor transfer, pneumatic or otherwise, may be used to store the powdered nutritional composition 12 and thereafter transfer the powdered nutritional composition 12 into the mixer 14.

As noted previously, atomized water may be used as the agglomerating agent 16. The size of the atomized water droplets that are used as the agglomerating agent 16 greatly influences the quality and hydration characteristics of the agglomerated product, such as the agglomerated intermediate 20, and derivatives of the agglomerated product, such as the dried agglomerated intermediate 24, the classified milk replacer product 28, and the packaged milk replacer product 32. More specifically, the quality and hydration characteristics of both the agglomerated product and derivatives of the agglomerated product are enhanced as the size of the atomized water droplets is decreased.

Appropriate water droplet sizes are those sizes that will permit the water droplets to stick to the particles of the powdered nutritional composition 12 in the mixer 14. After obtaining water droplets that are small enough to achieve this sticking of the water droplets to the particles, further decreases in water droplet size only enhances the hydration characteristics of both the agglomerated product and derivatives of the agglomerated product. On the other hand, if the water droplets are too large, the particles of the powdered nutritional composition 12 will stick to the water droplets in the mixer 14, clumping of the material present in the mixer 14 will tend to occur, and the hydration characteristics of both the agglomerated product and derivatives of the agglomerated product will be negatively impacted. In other words, excessive water droplet size for the atomized water will yield poor hydration characteristics for both the agglomerated product and derivatives of the agglomerated product. Consequently, the water droplet size for the atomized water is preferably minimized to maximize the hydration characteristics of both the agglomerated product and derivatives of the agglomerated product.

In preparation for atomizing the water, liquid water is metered to a predetermined number of the injectors 182 of the agglomerating mixer 110 using a positive displacement pump, such as a piston pump (not shown). The liquid water may be hydraulically atomized at the nozzle head 190 of each injector 182 being used to inject the agglomerating agent 16, without the aid of air, using liquid water pressures ranging up to about 200 psig. Some examples of commercially available setups that may be used as the nozzle head(s) 190 for hydraulically atomizing liquid water include the series M, series N, series LN, series LN-D, series NW, series LNN-W and series TNSSTC fine spray atomizing nozzles available from Spraying Systems Co. of Wheaton, Ill. Preferably, the nozzle head(s) 190 used for hydraulically atomizing liquid water is the series M fine spray atomizing nozzle.

Alternatively, pneumatically atomized water may be used as the agglomerating agent 16. In this mode, liquid water is again metered to a predetermined number of the injectors 182 of the agglomerating mixer 110. Liquid water and compressed air are separately introduced to each nozzle head 190 under pressure. The water is added through the injector(s) 182 and the air is supplied directly to the nozzle head(s) 190 through a pneumatic line (not shown). Both liquid water and compressed air are then mixed internally in the nozzle head to produce the atomized water spray that flows from the nozzle head(s) 190. The air pressure used to pneumatically atomize the water may generally range from about 10 psig to about 50 psig. The water pressure used when pneumatically atomizing the water may generally range from about 30 psig to about 60 psig. Two examples of commercially available setups that may be used as the nozzle head(s) 190 for pneumatically atomizing liquid water are the spray Set-Up No. SU12 internal atomizing nozzle and the spray Set-Up No. SU22B internal atomizing nozzle that are available from Spraying Systems Co. of Wheaton, Ill.

The concentration of water in the agglomerated intermediate 20 exiting the mixer 110 may generally range from about 3.3 weight percent to about 9.5 weight percent, based on the total weight of the agglomerated intermediate 20. Therefore, the amount of liquid water added in the form of hydraulically or pneumatically atomized water as the agglomerating agent 16 to the mixer 110 depends on both the concentration of water in the powdered nutritional composition 12 and the flow rate of the powdered nutritional composition 12.

Within these guidelines, when using the SCHUGI FLEX-O-MIX™ mixer (Model No. FX-160; Bepex ID. No. 961007), sized to receive the powdered nutritional composition 12 at a flow rate ranging from about 590 pounds per hour to about 680 pounds per hour, as the agglomerating mixer 110, the flow rate of the hydraulically or pneumatically atomized water that is added to the agglomerating mixer 110 as the agglomerating agent 16 may generally range from about 4.0 to about 5.5 gallons of liquid water per hour (about 33 to about 46 pounds of liquid water per hour). Correspondingly when using the SCHUGI FLEX-O-MIX™ mixer (Model No. FX-160; Bepex ID. No. 961007), sized to receive the powdered nutritional composition 12 at a flow rate ranging up to about 2000 pounds per hour, as the agglomerating mixer 110, the flow rate of the hydraulically or pneumatically atomized water that is added to the agglomerating mixer 110 as the agglomerating agent 16 may generally range up to about 20 gallons of liquid water per hour (about 162 pounds of liquid water per hour).

As noted previously, atomized steam may be used as the agglomerating agent 16 that is distributed to a predetermined number of the injectors 182 of the agglomerating mixer 110. As with the atomized water, the droplet size of the atomized steam should be small enough to permit the atomized steam droplets to stick to the particles of the powdered nutritional composition 12. Beyond this, further decreases in steam droplet size beneficially enhances the hydration characteristics of both the agglomerated product and derivatives of the agglomerated product.

The steam is hydraulically atomized at the nozzle head 190 of each injector 182 being used to inject the agglomerating agent 16, without the aid of air, using steam pressures, at the nozzle head 190, ranging from about 2 psig to about 90 psig at steam temperatures ranging from about 270° F. to about 295° F. Each nozzle head 190 used to introduce atomized steam into the agglomerating mixer 110 as the agglomerating agent 16 may be a fluid cap, such as Fluid Cap Nos. 2850 and 100150 that are available from Spraying Systems Co. of Wheaton, Ill. The fluid cap may require modification to allow for injection of atomized steam at a rate that optimizes agglomeration without causing the agglomerated intermediate to have an excessive moisture content. The reason that such modification may be required is that two different fluid caps may bracket, and therefore skip over, the optimum steam injection rate for a particular feed at particular operating conditions. That is, one cap may inject too little steam whereas another cap may inject too much steam. One example of such a modification may entail increasing the orifice diameter of Fluid Cap No. 100150 to 5/32 inch.

The steam flow rate to the mixer 110 may be set by monitoring and controlling pressures at two different points using a steam supply system, as best depicted at 210 in FIG. 9. The steam supply system 210 includes a steam source 212, a condensate knockout pot 214, a steam line 216 that connects the source 212 to the knockout pot 214, and a steam line 218 that connects the knockout pot 214 to the injector(s) 182 via a manifold 220 located proximate the injector(s) 182. Since the agglomerating agent 16 may be supplied to the mixer 110 using any number of the injectors, such as one, two, three, or four of the injector(s) 182, three of the four injectors 182 are depicted with dashed lines to indicate the optional nature of these injector(s) for purposes of injecting the agglomerating agent 16 into the mixer. Additionally, any of the injectors 182 may be used for injecting any agglomerating material(s) 16 and any of the injectors 182 may be used for injecting any emulsifying agent(s) 18.

The steam supply system 210 additionally includes a regulator valve 222 with a pressure gauge 224 that is located in-line with the steam line 216, a flow control valve 226 that is located in-line with the steam line 218, and a pressure gauge 228 that is in fluid connection with the steam line 218 and that is located immediately downstream from the flow control valve 226. When using the SCHUGI FLEX-O-MIX™ mixer (Model No. FX-160; Bepex ID No. 961007) as the mixer 110, the steam lines 216, 218 may each be insulated copper tubing with an internal diameter (i.d.) of about ½ inch and the knockout pot 214 may be a conventional, low pressure drop, steam knockout pot.

The steam flow rate to the mixer 110 may be set, to provide a known flow rate of steam to the mixer 110 by setting the valves 222, 226 to attain particular pressure readings at the gauges 224, 228 when the steam has a particular temperature at a particular point in the system 210. When using the SCHUGI FLEX-O-MIX™ mixer (Model No. FX-160; Bepex ID No. 961007) as the mixer 110, a flow rate of the powdered nutritional composition 12 to the mixer ranging from about 550 pounds per hour to about 2000 pounds per hour, and ½ inch i.d. insulated copper tubing as the lines 216, 218, the steam pressure at gauge 224 (referred to as "steam pressure # 1") may range from about 100 psig to about 120 psig and the steam pressure at gauge 228 (referred to as "steam pressure # 2") may range from about 2 to about 90 psig. Additionally, the temperature of the steam, which may be measured proximate gauge 228, should be selected to attain the desired temperature, such as for example about 75° F. to about 100° F., of the agglomerated intermediate 20 at the time of discharge from the agglomerating mixer 110.

The concentration of water in the agglomerated intermediate 20 exiting the mixer 110 may generally range from about 3.3 weight percent to about 9.5 weight percent, based on the total weight of the agglomerated intermediate 20. Therefore, the amount of water added as the agglomerating agent 16, such as atomized steam or atomized liquid water, to the mixer 110 depends on both the concentration of water in the powdered nutritional composition 12 and the flow rate of the powdered nutritional composition 12. Also, the temperature of the agglomerated intermediate 20 at the time of discharge from the agglomerating mixer 110 preferably ranges from about 75° F. to about 100° F. Therefore, the amount of atomized steam added to the agglomerating mixer 110 as the agglomerating agent 16 may include consideration of the temperature of the atomized steam, in addition to the aforementioned water addition variables, to attain the targeted preferred temperature range of the agglomerated intermediate 20 that is discharged from the agglomerating mixer 110.

Within these guidelines, when using the SCHUGI FLEX-O-MIX™ mixer (Model No. FX-160; Bepex ID. No. 961007), sized to receive the powdered nutritional composition 12 at a flow rate ranging from about 590 pounds per hour to about 680 pounds per hour, as the agglomerating mixer 110, the flow rate of the atomized steam that is added to the agglomerating mixer 110 as the agglomerating agent 16 may generally range from about 4.0 to about 5.5 gallons of liquid water per hour (about 33 to about 46 pounds of liquid water per hour). Correspondingly when using the SCHUGI FLEX-O-MIX™ mixer (Model No. FX-160; Bepex ID. No. 961007), sized to receive the powdered nutritional composition 12 at a flow rate ranging up to about 2000 pounds per hour, as the agglomerating mixer 110, the flow rate of the atomized steam that is added to the agglomerating mixer 110 as the agglomerating agent 16 may generally range up to about 20 gallons of liquid water per hour (about 162 pounds of liquid water per hour).

The emulsifying agent 18 may be introduced into the agglomerating mixer 110 by distributing the emulsifying agent 18 to a predetermined number of the injectors 182 of the agglomerating mixer 110. Some examples of commercially available setups that may be used as the nozzle head(s) 190 for pneumatically atomizing the emulsifying agent 18 are the Set-Up No. SUE28 internal atomizing nozzle, the Set-Up No. SUE28A internal atomizing nozzle, and the Set-Up No. SUE18 internal atomizing nozzle that are each available from Spraying Systems Co. of Wheaton, Ill.

The total weight flow rate of the emulsifying agent 18 into the agglomerating mixer 110 may generally range from 0 percent to about 6 percent of the weight flow rate of the powdered nutritional composition 12 into the mixer 110. The emulsifying agent 18 may be pneumatically atomized at the nozzle head 190 of each injector 182 being used to inject the emulsifying agent 18 using air pressures ranging from about 10 psig to about 50 psig and air temperatures ranging from about room temperature up to about 250° F.

The air used to pneumatically atomize the emulsifying agent 18 may be heated using a CHROMALOX brand electric heater that is available from Emerson Electric Company of Missouri. The air temperature is adjusted to maintain the emulsifying agent 18 at a temperature ranging from about 120° F. to about 130° F. This temperature range is typically adequate to hold the emulsifying agent 18 above the melting point of the emulsifying agent 18 and consequently avoid plugging the nozzle(s) 190. This temperature range is also typically adequate to suitably minimize the droplet size of the emulsifying agent 18 that is injected into mixer 110. On the other hand, temperatures of the emulsifying agent 18 greater than about 140° F. should typically be avoided when the emulsifying agent 18 includes lecithin to avoid degrading the lecithin. The pressure of the emulsifying agent 18, when pneumatically atomizing the emulsifying agent 18, may generally range from about 20 psig to about 50 psig. As an example, when the emulsifying agent 18 contains liquid fat, lecithin, and distilled monoglycerides or distilled diglycerides, hot air at 120° F. and a pressure from about 30 psig to about 40 psig may be used to atomize the emulsifying agent 18.

As mentioned, the agglomerated intermediate 20 is transferred from the agglomerating mixer 110 to the dryer 22, as best depicted in FIG. 1, to reduce the moisture content of, and optionally cool, the agglomerated intermediate 20. The temperature of the agglomerated intermediate 20 upon discharge from the agglomerating mixer 110 preferably ranges from about 75° F. to about 100° F. The temperature of the dried agglomerated intermediate 24 upon discharge from the dryer 24 is more preferably about 75° F. to about 80° F. One suitable example of the dryer 22 is the Static Fluid Bed System dryer (Model FBS-10.76; Bepex Id. No. 961058) that is available from Hosokawa Bepex Corporation of Minneapolis, Minn. The Static Fluid Bed System dryer is a fluidized bed dryer. Another suitable example of the dryer 22 is the Vibratory Fluid Bed System dryer that is available from Niro, Inc. of Columbia, Md.

Static fluidized bed dryers and vibratory fluid bed dryers operate by passing a heated gas, such as air, upward through a column or layer of wet granular material at a linear velocity that is sufficient to fluidize (suspend) the wet granular material in the heated gas. The drying action occurs by transfer of moisture from the wet granular material to the heated gas. The linear velocity of the rising heated gas within the dryer is defined as the fluidizing velocity.

The Static Fluid Bed System ("SFBS") dryer (Model FBS 10.76, Bepex Id. No. 961058) has three separate zones for drying and/or cooling wet granular material. In accordance with the details provided in the operating manual of the SFBS dryer (Model FBS 10.76, Bepex Id. No. 961058), drying zone 1 is the portion of the SFBS dryer where the material to be dried in the SFBS dryer, such as the agglomerated intermediate 20, is deposited into the SFBS dryer from the mixer 110 via the discharge chute 39 (not shown in FIG. 1) of the mixer 110; drying zone 3 of the SFBS dryer includes the section of the SFBS dryer (dryer 22) where the dried agglomerated intermediate 24 is discharged from the SFBS dryer (dryer 22); and drying zone 2 is located between and adjacent to drying zones 1 and 3. The SFBS Model 10.76 dryer also includes overflow weirs between zones 1 and 2, between zones 2 and 3, and between zone 3 and the exit from the SFBS dryer that govern the fluidized depth of the agglomerated intermediate 20 in zone 1, zone 2, and zone 3 of the SFBS dryer, respectively. The overflow weir height in the SFBS Model 10.76 dryer that may serve as the dryer 22 may generally be set at about 9 inches between zones 1 and 2, between zones 2 and 3, and between zone 3 and the exit from the SFBS dryer.

A first underflow weir connects, and selectively permits air flow from, drying zone 1 to drying zone 2, and a second underflow weir connects, and selectively permits air flow from, drying zone 2 to drying zone 3. When using the SFBS dryer (Model FBS 10.76, Bepex Id. No. 961058) as the dryer 22, the first underflow weir between zones 1 and 2 may generally be left open and the second underflow weir between zones 2 and 3 may generally be left closed. Drying zone 3 is typically used as a cooling portion of the SFBS dryer for cooling the agglomerated intermediate 20. Cooling is accomplished within drying zone 3 by pre-cooling the air that is used as the fluidizing air within zone 3.

The fluidizing velocity of the fluidizing air within drying zones 1, 2, and 3 may generally range from about 135 to about 165 feet per minute. The fluidizing velocity of the fluidizing air within drying zones 1, 2, and 3 is preferably minimized, though maintaining fluid suspension of the drying particles, to minimize and preferably eliminate changes to the particle shape and size distribution of the agglomerated intermediate 20 that enters the SFBS dryer. Generally, the fluidizing velocity in zones 1, 2 and 3 of the SFBS (Model FBS 10.76, Bepex Id. No. 961058) dryer may range from about 130 to about 249 feet per minute so long as the chosen fluidizing velocity minimizes, and preferably eliminates, changes to the particle shape and size distribution of the agglomerated intermediate 20 that enters the SFBS dryer (dryer 22).

The temperature of the inlet air that is introduced into drying zone 1 and drying zone 2 of the SFBS (Model FBS 10.76, Bepex Id. No. 961058) dryer that may be used as the dryer 22 may be adjusted to modify the moisture content of the dried agglomerated intermediate 24 that is discharged from the dryer 22. Generally, the temperature of the inlet air to zones 1 and 2 of the SFBS (Model FBS 10.76, Bepex Id. No. 961058) dryer may range from about 125° F. to about 180° F., and the flow rate of the inlet air that is introduced into zone 1 and zone 2 in the dryer 22 may range from about 490 to about 650 actual cubic feet per minute (ACFM). The flow rate temperature of the inlet air that is introduced into drying zone 3 of the SFBS (Model FBS 10.76, Bepex Id. No. 961058) dryer may be adjusted to modify the temperature of the dried agglomerated intermediate 24 that is discharged from the dryer 22. Preferably, the temperature of the dried agglomerated intermediate 24 is about 100° F. or less, and more preferably ranges from about 70° F. to about 80° F. Generally, the temperature of the inlet air to zone 3 of the SFBS (Model FBS 10.76, Bepex Id. No. 961058) dryer may range from about 54° F. to about 71° F., and the flow rate of the inlet air that is introduced into zone 3 in the dryer 22 may range from about 491 to about 655 actual cubic feet per minute (ACFM).

Fine particles that may be generated upon drying of the agglomerated intermediate 20 are collectively referred to as "fines." Fines may be generated in any drying mechanism that is incorporated as the dryer 22, such as the SFBS (Model FBS 10.76, Bepex Id. No. 961058) dryer or the Vibratory Fluid Bed System dryer that is available from Niro, Inc. "Fines" are more specifically defined as that portion of the agglomerated intermediate 20 that, in the course of being dried and cooled in the dryer 22, escapes from the dryer 22 though a screen or sieve. Thus, the particle size range of the "fines" depends upon the size or mesh of the particular screen or sieve that the fines pass through.

In the SFBS (Model FBS 10.76, Bepex Id. No. 961058) dryer, smaller particles generated in the course of drying and cooling the agglomerated intermediate 20 may become entrained in the fluidizing air. Typically, this phenomena occurs primarily in zone 3 of the SFBS (Model FBS 10.76, Bepex Id. No. 961058) dryer. The duct carrying the fluidizing air that is exhausted from the SFBS (Model FBS 10.76, Bepex Id. No. 961058) dryer may include a screen, such as a Bureau of Standards Sieve Number 140 mesh screen from the U.S. Standard Sieve Series.

Smaller particles that become entrained in the fluidizing air may be split into two fractions, depending upon whether the particles pass through, or do not pass through, the screen. Those particles that do not pass through the screen are not considered to be fines, but instead are permitted to fall back into the dryer for further processing as part of the agglomerated intermediate 20. Those particles that do pass through the screen are considered to be fines. These fines may be reclaimed from the exhausted fluidizing air by passing the fluidizing air through a conventional dust collection system, such as a conventional bag house. The screen is optional, and the exhausted fluidizing air may instead be permitted to carry all entrained particles to the dust collection system, such as the bag house. In this scenario, all entrained particles captured in the dust collection system would be considered to be fines.

The generation of fines is preferably minimized by selective control of the operating conditions in the dryer 22 to maintain the shape and size distribution of the particles that make up the agglomerated intermediate 20. Nonetheless, should any fines be generated in the dryer 22, these fines may be, and preferably are, combined with the powdered nutritional composition 12 and are thereafter introduced back into the mixer 14, such as the mixer 110, as part of the powdered nutritional composition 12.

After the agglomerated intermediate 20 is dried in the dryer 22, the dried agglomerated intermediate 24 is transferred to the classifier 26. The classifier 26 selectively sieves the particles of the dried agglomerated intermediate 24 on a screen (not shown) into an undersize fraction of particles that pass through the screen of the classifier 26 and into an oversized fraction of particles that do not pass through the screen of the classifier 26. The screen used in the classifier 26 may be a Bureau of Standards Sieve Number 12, 14, or 16 mesh screen from the U.S. Standard Sieve Series, but is preferably a Bureau of Standards Sieve Number 12 or 14 mesh screen from the U.S. Standard Sieve Series. One suitable example of the classifier 26 is a Kason (Model K48-2CS) screener that is available from Kason Corporation of Miliburn, N.J.

The undersize fraction of particles that pass through the screen of the classifier 26 forms the classified milk replacer product 28. The classified milk replacer product 28 may be transferred by suitable conveying means, such as a pneumatic conveyor (not shown), to the packaging unit 30 for placement into packages to form the packaged milk replacer product 32. The oversize fraction that is generated in the classifier 26 may generally be recombined, after particle size modification, as part of the powdered nutritional composition 12 that is fed to the mixer 110. The particles of the oversize fraction may be ground using any conventional grinding mechanism (not shown), such as a ball mill or a bowl mill, to fall within the particle size range of the powdered nutritional composition 12. One example of a suitable grinding mechanism is the Pulvocron® airswept pulverizer/classifier that is available from Hosokawa Bepex Corporation of Minneapolis, Minn. Alternatively, it has been surprisingly found that the particles of the oversize fraction may be ground to approximate the particle size range of the packaged milk replacer product 32 and then combined with the classified milk replacer product 28 without significantly affecting the rehydration and fat dispersion properties of the packaged milk replacer product 32.

Following production, the agglomerated product, such as the agglomerated intermediate 20, and any derivative of the agglomerated product, such as the dried agglomerated intermediate 24, the classified milk replacer product 28, or the packaged milk replacer product 32 may be rehydrated with water, or in an aqueous solution, to produce a liquid milk replacer. The concentration of the agglomerated product, or the concentration of any derivative of the agglomerated product, in the water or aqueous solution may be varied in any ratio, depending upon the desired concentration of nutrients in the liquid milk replacer and the desired consistency of the liquid milk replacer. Preferably, however, the packaged milk replacer product 32 is rehydrated in water to form rehydrated milk replacer product (also referred to as a "liquid milk replacer") having a total solids concentration ranging from about 10 weight percent to about 20 weight percent, based on the total weight of the rehydrated milk replacer product.

When forming the liquid milk replacer with the agglomerated intermediate 20, the dried agglomerated intermediate 24, the classified milk replacer 28, or the packaged milk replacer product 32 that are produced in accordance with the present invention to incorporate the emulsifying agent(s), it has been surprisingly found that the resulting liquid milk replacer exhibits much enhanced fat-in-water emulsion stability and far less fat separation as compared to liquid milk replacers that are based on prior powdered milk replacers. Preferably, formation of the liquid milk replacer by rehydrating 100 grams of the agglomerated intermediate 20, the dried agglomerated intermediate 24, the classified milk replacer 28, or the packaged milk replacer product 32 in 350 milliliters of 80° F. water yields liquid milk replacer exhibiting about 6 volume percent or less of fat separation, based on the total volume of the inventive liquid milk replacer, after being allowed to rest undisturbed for about 60 minutes. This exhibition of about 6 volume percent or less of fat separation, based on the total volume of the inventive liquid milk replacer, after being allowed to rest undisturbed for about 60 minutes more preferably exists even when the agglomerated product or derivative thereof has a relatively high concentration of fat, such as when the concentration of fat in the milk replacer product ranges from about 25 weight percent to about 52 weight percent, based on the total weight of the milk replacer product.

As an example, when 100 grams of the packaged milk replacer product 32 are combined and mixed with 350 milliliters of 80° F. water to form an improved liquid milk replacer in accordance with the present invention, the amount of separated fat observed floating on the solution typically ranges from about ½ volume percent to about 6 volume percent, based on the total volume of the inventive liquid milk replacer, after being allowed to rest undisturbed for about 60 minutes, especially when emulsifying agent(s) is incorporated in the packaged milk replacer product 32 in accordance with the present invention. More preferably, rehydration of the packaged milk replacer product 32 in water yields liquid milk replacer with a level of separated fat of about 3 volume percent, or less, based on the total volume of the liquid milk replacer. Most preferably, rehydration of the packaged milk replacer product 32 in water yields liquid milk replacer with a level of separated fat of about 2 volume percent, or less, based on the total volume of the liquid milk replacer. All details provided in this paragraph and the previous paragraph are based upon a total solids concentration in the liquid milk replacer that ranges from about 10 weight percent to about 20 weight percent, based on the total weight of the liquid milk replacer.

On the other hand, when 100 grams of the prior art powdered milk replacer is combined and mixed with 350 milliliters of water to form a prior art liquid milk replacer, the amount of separated fat observed floating on the solution typically ranges from about 7 volume percent to about 9 volume percent, or more, based on the total volume of the prior art liquid milk replacer, after being allowed to rest undisturbed for about 60 minutes or more. Thus, the improved liquid milk replacer that is based upon the packaged milk replacer product 32 produced in accordance with the present invention to incorporate emulsifying agent(s) typically exhibits at least about 16% less fat separation than prior art liquid milk replacers, on a volume basis, and may even exhibit up to about four times, or more, less fat separation than prior art liquid milk replacers, on a volume basis.

Besides decreased fat separation upon hydration, the improved milk replacers of the present invention, such as any of the agglomerated intermediate 20, the dried agglomerated intermediate 24, the classified milk replacer 28, and the packaged milk replacer product 32 that are produced in accordance with the present invention, each exhibit a number of other beneficial properties, as compared to prior milk replacers produced in accordance with the prior art. For example, the improved milk replacers of the present invention exhibit enhanced hydration (wetting) rates, as compared to the prior milk replacers produced in accordance with the prior art. Also, the improved milk replacers of the present invention exhibit decrease sedimentation rates, as compared to the prior milk replacers produced in accordance with the prior art, when hydrated in water. Furthermore, the improved milk replacers of the present invention exhibit much less clumping or caking, prior to hydration, as compared to the prior milk replacers produced in accordance with the prior art Various analytical techniques are employed herein. An explanation of these techniques follows. All values presented in this document for a particular parameter, such as weight percent fat or weight percent protein, are based on the "as is" sample and are therefore on a "wet basis", unless otherwise specified herein.

Analytical Methods & Property Determination Techniques

Total Solids

To determine the weight percent total solids, wet basis, in a sample, the actual weight of total solids is determined by analyzing the sample in accordance with Method #925.23 (33.2.09) of *Official Methods of Analysis*, Association of Official Analytical Chemists (AOAC) (16th Ed., 1995). The weight percent total solids, wet basis, is then calculated by dividing the actual weight of total solids by the actual weight of the sample.

Weight Percent Fat

To determine the weight percent fat, wet basis, in a sample, the actual weight of fat in the sample is determined in accordance with Method #932.06 (33.7.18) of *Official Methods of Analysis*, Association of Official Analytical Chemists (AOAC) (16th Ed., 1995). The weight percent fat, wet basis, is then calculated by dividing the actual weight of fat in the sample by the actual weight of the sample. The weight percent fat, dry basis may also be calculated by dividing the weight percent fat, wet basis, by the weight percent total solids, wet basis, and then multiplying this result by 100.

Weight Percent Total Protein

To determine the weight percent total protein, wet basis, in a sample, the weight percent of total nitrogen in the "as is" sample is first determined in accordance with the "Traditional Method" (Sections A–H) of Method #991.20 (33.2.11) of *Official Methods of Analysis*, Association of Official Analytical Chemists (AOAC) (16th Ed., 1995; March, 1996 Supplement). The weight percent total protein in the "as is" sample is then calculated using the "Kjeldahl Method" (Section A) of Method #930.29 (33.5.03) of *Official Methods of Analysis*, Association of Official Analytical Chemists (AOAC) (16th Ed., 1995; March, 1996 Supplement). The weight percent total protein, dry basis may also be calculated by dividing the weight percent total protein, wet basis, by the weight percent total solids, wet basis, and then multiplying this result by 100.

Weight Percent Water

To determine the weight percent of water, expressed as free moisture, in a particular sample, the sample is accurately weighed and placed into a previously oven dried, desiccated (cooled to room temperature), weighed, stoppered glass weighing bottle or covered weighing pan. This sample is weighed to the nearest milligram. The weighing bottle or pan is inserted into a vacuum oven, after removing the stopper or the cover; the stopper or cover is also placed in the vacuum oven. The weighing bottle or pan, the stopper and the cover, are then dried for 15 hours (overnight) at about 64° C. to about 65° C. under 20 millimeters of mercury vacuum. The vacuum is then released, and air is passed through the vacuum oven. The stopper or cover is replaced on the sample weighing bottle or weighing pan and removed to a desiccator. The sample is cooled for 1 hour to room temperature and weighed. The weight percent free moisture in the sample, is then calculated by subtracting the dried weight of the sample from the initial weight of the sample and dividing this difference by the initial weight of the sample.

Particle Size Distribution

A laser particle size analyzer and sample introduction system may be used for determining the size distribution of particulate samples. After the laser particle size analyzer is configured as appropriate for the particle size range expected, based on the instruction manual of the analyzer, the sample is introduced into an air stream created by compressed air and vacuum. A computer and printer is connected to this equipment. Washed sand (Fisher Scientific cat. No. S25) is used to flush out the system after analysis is complete. Measurement of the particle size distribution is recorded in micrometers by the computer. The laser size analyzer, sample introduction system, computer and software are available from Malvern Instruments of Southborough, Mass. as the Series 2600 size analysis system.

Wettability

The wettability of a particular sample is determined by placing approximately 200 milliliters of 110° F. tap water into a 250 milliliter beaker, and adding 1 heaping tablespoon of the sample. The sample is then distributed evenly across the surface of water. A timer is started and the number of seconds it takes for all of the sample to be wetted is documented. If the sample is not completely wetted in 30 seconds, an estimate of the percent of the sample that is wetted (that is 25%, 50% or 75%) is recorded. For the classified milk replacer product 28, it is preferred to obtain 100% wettability in 20 seconds or less, in 80% of all samples tested; or to obtain 50% wettability in 20 seconds or less, in 100% of all samples tested.

Dispersability

The dispersability of a particular sample is determined by filling a 250 milliliter beaker two-thirds full with 110° F. tap water. A heaping tablespoon of the sample is added to this water in the beaker, and stirred slowly to mix the sample with the water by moving a teaspoon back and forth across the beaker 12 times. Any floating lumps of the sample is then observed and graded based on interpretation. The grading standards for interpreting dispersability are presented in Table 3 below:

TABLE 3

| Dispersability Rating | Observed Dispersability |
| --- | --- |
| 0 | No floating particles or lumps |
| 1 | No more than 6 floating lumps |
| 2 | 25% of surface covered with floating lumps |
| 3 | More than 25% of surface covered with floating lumps |

For the classified milk replacer product 28, it is preferred that the average dispersability rating be 0.5 or below, in 0 to 90% of all the samples.

Sedimentation

To determine the sedimentation of a particular sample powder, the liquid and any floating matter present in the sample prepared to evaluate the dispersability of the particular sample powder is carefully poured out of the 250 milliliter beaker. The sediment, if any, on the bottom of the 250 milliliter beaker is examined by evaluating how much of a layer of sediment, if any, is present on the bottom of the beaker. The sedimentation properties of the particular sample are graded according to the standards listed in Table 4 below:

TABLE 4

| Sedimentation Rating | Observed Sedimentation |
| --- | --- |
| 0 | None |
| 1 | Slight |
| 2 | Bottom covered with very thin layer |
| 3 | Bottom covered with 1/16 inch or more |

For the classified milk replacer product 28, it is preferred that the average sedimentation rating be 0.5 or below, in 0 to 90% of all the samples.

Solubility

To evaluate the solubility of a particular sample powder, a 250 milliliter beaker is filled two-thirds full with 110° F. tap water. The sediment, if any, that is evaluated in the sedimentation testing for a particular sample powder is added to the water, and stirred slowly by moving a teaspoon back and forth across the beaker 12 times. The water is poured off and the sediment, if any, on the bottom of the beaker is examined by counting particles and feeling the texture of the particles. The solubility properties of a particular sample based on the procedure above are graded according to the standards listed in Table 5:

TABLE 5

| Solubility Rating | Amount of Sediment | Texture of Sediment |
| --- | --- | --- |
| 0 | None | None |
| 1 | Minimal < 10 particles | Soft |
| 2 | Moderate 10–24 particles | Some Texture |
| 3 | Substantial > 24 particles | Hard Grit |

For the classified milk replacer product 28, it is preferred that the solubility rating be less than 1 in 0 to 25% of all the samples tested. For the classified milk replacer product 28, it is preferred that the average solubility rating for all samples tested be in the range of 0 (none) to 2 (moderate). More specifically, when tested in accordance with this procedure, the rehydrated product of the classified milk replacer product 28 preferably exhibits 24 particles, or less, of sediment and any sediment particles that are present are not in the form of hard grit.

Volume Percent Fat

To determine the volume percent of fat separation upon rehydration of a particular powdered milk sample in water, the following procedure is used. First, 100 grams of the powdered milk sample and 0.05 gram of sudan red dye are weighed out, combined, and whisked together for about 30 seconds. Sudan red dye is a lipid soluble dye that stains lipids red and thereby serves as a visual aid to gauge the amount, if any, of fat separation. The mixture of the powdered milk and sudan red dye is then added to 350 milliliters of 80° F. distilled water in a 1000 milliliter tall form beaker. A shaft-mounted propeller of a mixing unit is placed in the 1000 milliliter beaker within about ½ inch of the bottom of the beaker. The mixing unit is turned on to rotate the propeller at about 1200 revolutions per minute for about three minutes.

The contents of the 1000 milliliter beaker are then poured into a 500 milliliter graduated cylinder. The total height of the fluid in the graduated cylinder is documented. Then, after a predetermined time interval, such as about 15 minutes, has passed, the amount of any separated fat, is documented by measuring the height of the red-dyed portion of the graduated cylinder contents. The red-dyed portion, if any, constitutes separated fat, since the sudan red dye is lipid-soluble. Dividing the height of the red-dyed portion of the graduated cylinder contents by the total height of the fluid in the graduated cylinder is an accurate representation of the volume fraction of separated fat in the total volume of the rehydrated powdered milk sample because (1) the sudan red-dye is lipid-soluble and therefore stains only fat that separates as a distinct phase in the rehydrated powdered milk and (2) the internal diameter of the graduated cylinder is constant from the top to the bottom of the graduated cylinder. The volume percent of fat separation upon rehydration of the powdered milk sample in water is calculated by dividing the height of the red-dyed portion of the graduated cylinder contents by the total height of the fluid in the graduated cylinder and multiplying this result by 100.

The present invention is more particularly described in the following examples that are intended as illustrations only since numerous modifications and variations within the scope of the present invention will be apparent to those skilled in the art.

EXAMPLES

In each of Examples 1–10 that are presented below, the agglomerating mixer 110 was the SCHUGI FLEX-O-MIX™ Model FX-160 agglomerating mixer that was sized to have an operating capacity for about 590 pounds to about 680 pounds of the powdered nutritional composition 12 per hour, and the mixing shaft 162 of the agglomerating mixer 110 was rotated at about 3000 revolutions per minute. Also, in each of Examples 1–10 that are presented below, the dryer 22 was the Static Fluid Bed System (Model FBS 10.76) dryer. The overflow weir height that governed the fluidized depth of the agglomerated intermediate 20 in the dryer 22 was set at 9 inches between zones 1 and 2, between zones 2 and 3, and between zone 3 and the exit from the dryer 22. The classifier 26 used in Examples 1–10 to classify the dried agglomerated intermediate 24 was the Kason (Model K48-2CS) screener. In the Examples, the total weight of the dried agglomerated intermediate 24 includes the weight of fines collected from the dryer 22.

In each of Examples 1–10, the knives 198 carried by the blade assembly 192 were each positioned to diverge away from the plane E at an angle of about 5°; the knives 198 carried by the blade assembly 194 were each positioned to be parallel to the plane F; and the knives 198 carried by the blade assembly 196 were each positioned to diverge away from the plane G at an angle of about 5°.

Furthermore, in each of Examples 1–10, the agglomerating mixer 110 had four of the injectors 182, namely, the first injector 182a, the second injector 182b, the third injector 182c, and the fourth injector 1 82d. Each injector 182 included one of the nozzle heads 190. In Examples 1–5 and 8–10, the emulsifying agent 18 was injected into the mixer 110 using only one of the injectors 182, and the agglomerating agent 16 was injected into the mixer 110 using either two or three of the remaining injectors 182, depending upon the particular example. In Examples 6–7, multiple agglomerating agents 16 were employed without using employing the emulsifying agent 18. When a particular agglomerating agent was introduced via multiple injectors 182, the particular agglomerating agent 16 was uniformly distributed between the different injectors 182 used for the particular agglomerating agent in the particular example.

The injectors 182 that were used to introduce the agglomerating agent 16 into the mixer 110 were each oriented to direct the agglomerating agent 16 exiting the nozzle heads 190 in the same direction as the direction the mixing shaft 162 was rotating. In the examples where atomized steam was used as the agglomerating agent 16, the steam was metered to the injectors 182 of the mixer 110 using the steam supply system 210 in which the steam lines 216, 218 were each insulated copper tubing with an internal diameter of about ½ inch. Unless otherwise indicated, all determinations of weigh percent total protein in the Examples were made in accordance with the total protein determination procedure that is addressed in the ANALYTICAL METHODS & PROPERTY DETERMINATION TECHNIQUES section of this document, and all determinations of weight percent fat in the Examples were made in accordance with the fat determination procedure that is addressed in the ANALYTICAL METHODS & PROPERTY DETERMINATION TECHNIQUES section of this document.

Examples 1–2

Examples 1 and 2 illustrate preparation of an agglomerated milk replacer in accordance with the present invention using atomized steam as the agglomerating agent 16 and a mixture of liquid fats as the emulsifying agent 18. In Example 1, the powdered nutritional composition 12 was a blend, based upon the total weight of the powdered nutritional composition 12, of about 47 to about 51 weight percent fat base, about 46 to about 50 weight percent protein blend, and 0 to about 2 weight percent dietary additives. The protein blend of Example 1 was made up of proteinaceous ingredients previously described above in relation to the powdered nutritional composition 12.

The fat base in Example 1 was a blend of about 50 weight percent "7-40-60 whey" fat base component and about 50 weight percent "7-40 de-lactosed whey/permeate" fat base component, based upon the total weight of the fat base. The fat base in Example 1 included about 38 to about 40 weight percent fat, about 57 to about 59 weight percent protein, and about 2 to about 3.5 weight percent crude lecithin, based upon the total weight of the fat base. The crude lecithin is available from Archer Daniels Midland Co. of Decatur, Ill. as Yelkin crude soya lecithin.

The "7-40-60 whey" fat base component contained about 40 percent fat (primarily as lard) and about 60 weight percent whey, based upon the total weight of the "7-40-60 whey" fat base component. The "7-40-60 whey" fat base component contained about 7 weight percent total protein, which was primarily contributed by the whey. The "7-40 de-lactosed whey/permeate" fat base component contained about 40 weight percent fat (primarily as lard), and about 60 weight percent high lactose content whey permeate, based on the total weight of the "7-40 de-lactosed whey/permeate" fat base component. High lactose content whey permeate is formed by ultrafiltering whey. The weight ratio of de-lactosed whey to high lactose content whey permeate in the "7-40 de-lactosed whey/permeate" fat base component was selected to provide the "7-40 de-lactosed whey/permeate" fat base component a total protein content of about 7 weight percent, based upon the total weight of the "7-40 de-lactosed whey/permeate" fat base component.

In Example 2, the powdered nutritional composition 12 included about 27 to about 31 weight fat base, about 68 to about 72 weight percent protein blend, and 0 to about 2 weight percent dietary additive. The protein blend in Example 2 was a blend of the proteinaceous ingredients previously discussed above in relationship to the powdered nutritional composition 12. In Example 2, the fat base was a blend of about 50 weight percent "13-60 WPC" fat base component and about 50 weight percent "13-60 permeate" fat base component, based upon the total weight of the Example 2 fat base. The Example 2 fat base included about 56 to about 58 weight percent lard, about 38 to about 40 weight percent protein, and about 3 to about 4 weight percent lecithin, based on the total weight of the Example 2 fat base. The lecithin used in the Example 2 fat base was the same as the lecithin used in the Example 1 fat base.

The "13-60 WPC" fat base component included about 60 weight percent fat (primarily as lard) and about 40 weight percent whey protein concentrate, based upon the total weight of the "13-60 WPC" fat base component. The "13-60 WPC" fat base component included about 13 weight percent total protein, which was primarily contributed by the whey protein concentrate. The "13-60 permeate" fat base component included about 60 weight percent fat (primarily as lard) and about 40 weight percent of a blend of high lactose content whey permeate and whey protein concentrate, based upon the total weight of the "13-60 permeate" fat base component. The weight ratio of high lactose content whey permeate to whey protein concentrate in the "13-60 permeate" fat base component was selected to provide the "13-60 permeate" fat base component a total protein content of about 13 weight percent, based upon the total weight of the "13-60 permeate" fat base component.

The powdered nutritional composition 12 was introduced into the agglomerating mixer 110 via one of the tubular feed ports 148, namely the first tubular feed port 148*a*, at a rate of about 600 pounds per hour. Hydraulically atomized steam, the agglomerating agent 16 in Examples 1–2, was injected into the mixer 110 using the first injector 182*a*, the second injector 182*b*, and the fourth injector 182*d*. In Example 1, steam pressure # 1 was about 100 psig, steam pressure # 2 was about 84 psig, and the steam temperature was about 290° F.; in Example 2, steam pressure # 1 was about 100 psig, steam pressure # 2 was about 76 psig, and the steam temperature was about 290° F. The nozzle head 190 used to introduce steam into the agglomerating mixer 110 as the agglomerating agent 16 in both Example 1 and Example 2 was Fluid Cap No. 100150 that is available from Spraying Systems Co. of Wheaton, Ill.

In Examples 1 and 2, the emulsifying agent 18 was about 94 weight percent lard and about 6 weight percent crude lecithin, based on the total weight of the emulsifying agent 18. The crude lecithin is available from Archer Daniels Midland Co. of Decatur, Ill. as Yelkin crude soya lecithin. The emulsifying agent 18 was heated to a range of about 120° F. to about 130° F. to prevent the emulsifying agent 18 from solidifying while being pumped into the agglomerating mixer 110. The emulsifying agent 18 was atomized with hot air that had a pressure of about 30 psig and a temperature of about 220° F., using spray nozzle Set-Up No. SUE28A that is available from Spraying Systems Co. of Wheaton, Ill. as the nozzle head 190. The emulsifying agent 18 was injected into the agglomerating mixer 110 using the third injector 182*c* at a flow rate of about 1 part by weight of emulsifying agent 18 per 100 parts by weight of the powdered nutritional composition 12. The actual feed rate of the emulsifying agent 18 into the agglomerating mixer 110 was about 6.3 pounds per hour in Example 1 and about 6.1 pounds per hour in Example 2.

After exiting the agglomerating mixer 110, the agglomerated intermediate 20 was introduced into the dryer 22. The operating conditions for the dryer 22 in Examples 1–2 are presented in Table 6 below:

TABLE 6

| Operating Variable | Value for Operating Variable | |
|---|---|---|
| | Example 1 | Example 2 |
| Air Flow (ACFM) Zone 1 | 639 | 632 |
| Air Flow (ACFM) Zone 2 | 598 | 634 |
| Air Flow (ACFM) Zone 3 | 656 | 649 |
| Fluidizing Velocity (FPM) Zone 1 | 178 | 176 |
| Fluidizing Velocity (FPM) Zone 2 | 167 | 177 |
| Fluidizing Velocity (FPM) Zone 3 | 183 | 181 |
| Inlet Air Temperature (° F.) Zone 1 | 169 | 147 |
| Inlet Air Temperature (° F.) Zone 2 | 137 | 149 |
| Inlet Air Temperature (° F.) Zone 3 | 61 | 58 |

The agglomerated intermediate 20 exiting the agglomerating mixer 110 had a concentration of water of about 6.14 weight percent in Example 1 and about 6.75 weight percent in Example 2, based on the total weight of the agglomerated intermediate 20. The dried agglomerated intermediate 24 exiting the dryer 22 had a concentration of water of about 2.96 weight percent in Example 1 and about 3.44 weight percent in Example 2, based on the total weight of the agglomerated intermediate 20.

Monitoring was conducted in Example 2 to determine the oversize particle generation rate and the fines generation rate. In Example 2, the screen of the Kason screener was a Bureau of Standards Sieve No. 14, and the screen yielded an oversize rate of about 4.1 weight percent oversize particles, based on the total weight of the dried agglomerated intermediate 24. The screen used to classify particles entrained in the fluidizing air exhausted from the dryer 22 was a Bureau of Standards Sieve Number 140 mesh screen from the U.S. Standard Sieve Series. The fines passing through this screen were recovered in a bag house. In Example 2, about 8 weight percent of fines, based on the total weight of the dried agglomerated intermediate 24, were recovered from the dryer 22.

Samples of the dried agglomerated intermediate 24 produced in Examples 1 and 2 were subjected to wettability, dispersability, sedimentation, and solubility analysis as described in the analytical methods and property determination section of this document. Each sample for wettability, dispersability, solubility and sedimentation testing was assayed three times.

Samples of the dried agglomerated intermediate 24 were tested for wettability. The results of this example were excellent since 100% of the dried agglomerated intermediate 24 samples were fully wetted within about 15 seconds or less. When the same samples of the dried agglomerated intermediate 24 were tested using the dispersability testing procedure, no floating lumps were observed on top of the solution in the test container and each of the samples therefore exhibited a "0" rating. These results were excellent, since the desired dispersability rating is to obtain a rating of 0.5 or below, in 0 to 90% of all the samples.

When the same samples of dried agglomerated intermediate 24 were subjected to the sediment testing procedure, each of the samples had a rating of "0.5 to 1" or less, which generally indicates no, or only slight, sedimentation upon rehydration. These sedimentation results were excellent since the desired sediment rating is 0 to less than 1in 0% to 25% of the samples tested. When the same samples of the dried agglomerated intermediate 24 were subjected to the solubility testing procedure, the samples each were rated at "moderate," which generally indicates that ten to twenty-four undissolved particles were observed, and there was some soft texture to the sediment. The sedimentation results for these samples were therefore excellent, since the desired solubility is a rating of moderate or below.

Examples 3–7

These examples illustrate preparation of the agglomerated milk replacer product in accordance with the present invention (1) using atomized steam as the agglomerating agent 16 and a blend of liquid fat with a mixture of fluid soy lecithin, propylene glycol, ethoxylated monoglycerides, and ethoxylated diglycerides as the emulsifying agent 18 or (2) using atomized steam and a separately added sugar/water blend as the agglomerating agent 16, without adding any of the emulsifying agent 18. In Examples 3–5, the powdered nutritional composition 12 was a blend, based on the total weight of the powdered nutritional composition 12, of about 27 to about 31 weight percent fat base, about 68 to about 72 weight percent protein blend, and 0 to about 2 weight percent dietary additives.

The protein blend of Examples 3–7 was formed of proteinaceous ingredients that were previously described above in relation to the powdered nutritional composition 12. The fat base of Examples 3–5 was formed entirely from "13-60 WPC/whey permeate" fat base component. The "13-60 WPC/whey permeate" fat base component included about 60 weight percent fat (primarily as lard), about 37 weight percent of a blend of whey protein concentrate and whey permeate, and about 3 weight percent MONICS blend of distilled monoglycerides and distilled diglycerides, based upon the total weight of the "13-60 WPC/whey permeate" fat base component. The ratio of whey protein concentrate to whey permeate in the "13-60 WPC/whey permeate" fat base component was selected to provide the "13-60 WPC/whey permeate" fat base component with a total protein concentration of about 13 weight percent, based upon the total weight of the "13-60 WPC/whey permeate" fat base component.

The fat base of Examples 6–7 was formed entirely from "13-60 WPC/whey" fat base component. The "13-60 WPC/whey" fat base component included about 60 weight percent fat (primarily as lard), about 37 weight percent of a blend of whey protein concentrate and whey and about 3 weight percent MONICS blend of distilled monoglycerides and distilled diglycerides, based upon the total weight of the "13-60 WPC/whey" fat base component. The ratio of whey protein concentrate to whey in the "13-60 WPC/whey" fat base component was selected to provide the "13-60 WPC/whey" fat base component with a total protein concentration of about 13 weight percent, based upon the total weight of the "13-60 WPC/whey" fat base component.

The MONICS blend of distilled monoglycerides and distilled diglycerides that was included in both the "13-60 WPC/whey permeate" fat base component of Examples 3–5 and in the "13-60 WPC/whey" fat base component of Examples 6–7 was obtained from Food Basics of Holland. The powdered nutritional composition 12 that was used in Examples 3–7 had a loose bulk density ranging from about 30 to about 32 pounds per cubic foot.

The powdered nutritional composition 12 was introduced into the agglomerating mixer 110 via one of the tubular feed ports 148, namely the first tubular feed port 148a, at a rate of about 600 pounds per hour in each of Examples 3–7. In Examples 3–7, hydraulically atomized steam was injected into the mixer 110 using the first injector 182a, the second injector 182b, and the fourth injector 182d. The nozzle head 190 used to introduce the hydraulically atomized steam into the agglomerating mixer 110 in each of Examples 3–7 was Fluid Cap No. 100150 that is available from Spraying Systems Co. of Wheaton, Ill. The steam pressure #1, steam pressure #2, and steam temperature for the steam used as the agglomerating agent 16 in Examples 3–7 are presented in Table 7 below:

TABLE 7

| Operating | Value for Operating Variable | | | | |
|---|---|---|---|---|---|
| Variable | Example 3 | Example 4 | Example 5 | Example 6 | Example 7 |
| Steam Pressure #1 (psig) | 100 | 100 | 100 | 100 | 100 |
| Steam Pressure #2 (psig) | 37 | 37 | 37 | 18 | 18 |
| Steam Temperature (° F.) | 292 | 292 | 291 | 275 | 275 |

In addition to steam, two different sugar/water solutions were also added as part of the agglomerating agent 16 in Examples 6–7. None of the emulsifying agent 18 was used in either Example 6 or Example 7. In Example 6, the additional agglomerating agent 16 was a sugar/water blend of 50 weight percent water and 50 weight percent CLEARSWEET® 50% High Maltose Corn Syrup, based on the total weight of the sugar/water blend. CLEARSWEET® 50% High Maltose Corn Syrup is available from the North American Corn Milling Division of Cargill Foods of Cedar Rapids, Iowa. In Example 7, the additional agglomerating agent 16 was a sugar/water blend of 50 weight percent water and 50 weight percent SATIN SWEET™ 65% Maltose Corn Syrup, based on the total weight of the sugar/water blend. SATIN SWEET™ 65% Maltose Corn Syrup is available from the North American Corn Milling Division of Cargill Foods of Cedar Rapids, Iowa. In Examples 6–7, the additional agglomerating agent 16 (sugar solution) was injected into the agglomerating mixer 110 using the third injector 182c at a flow rate of about ½ part by weight of the sugar solution per 100 parts by weight of the powdered nutritional composition 12, or at a feed rate of about 3 pounds of the sugar solution per hour.

Three different liquid fat-based blends were used as the emulsifying agent 18 in Examples 3–5. Again, the emulsifying agent 18 was not employed in either Example 6 or Example 7. In Example 3, the emulsifying agent 18 was a blend of about 94 weight percent lard and about 6 weight percent crude lecithin, based on the total weight of the emulsifying agent 18. The crude lecithin is available from Archer Daniels Midland Co. of Decatur, Ill. as Yelkin crude soya lecithin. In Example 4, the emulsifying agent 18 was a blend of about 47 weight percent lard, about 3 weight percent lecithin, and about 50 weight percent of the MAXEMUL 210 blend of fluid soy lecithin, propylene glycol, ethoxylated monoglycerides and ethoxylated diglycerides, based on the total weight of the emulsifying agent 18. In Example 5, the emulsifying agent 18 was a mixture of about 19 weight percent lard, about 1 weight percent lecithin, and about 80 weight percent of the MAXEMUL 210 blend of fluid soy lecithin, propylene glycol, ethoxylated monoglycerides and ethoxylated diglycerides, based on the total weight of the emulsifying agent 18.

In Examples 3–5, the emulsifying agent 18 was heated to a range of about 120° F. to about 130° F. to prevent the emulsifying agent from solidifying while being pumped into the agglomerating mixer 110. In Examples 3–7, the emulsifying agent 18 was pressurized to about 40 psig and was atomized using 30 psig hot air with a temperature of about 220° F. in the nozzle head 190, which was spray nozzle Set-Up SUE28A that is available from Spraying Systems Co. of Wheaton, Ill. In Examples 3–5, the emulsifying agent 18 was injected into the agglomerating mixer 110 using the third injector 182c at a flow rate of about 1 part by weight of emulsifying agent 18 per 100 parts by weight of the powdered nutritional composition 12, or at a feed rate of about 6 pounds of the emulsifying agent 18 per hour.

After exiting the agglomerating mixer 110, the agglomerated intermediate 20 produced in Examples 3–7 was introduced into the dryer 22. The operating conditions for the dryer 22 in Examples 3–7 are presented in Table 8 below:

TABLE 8

| Operating | Value for Operating Variable | | | | |
|---|---|---|---|---|---|
| Variable | Example 3 | Example 4 | Example 5 | Example 6 | Example 7 |
| Air Flow (ACFM) Zone 1 | 610 | 609 | 609 | 624 | 627 |
| Air Flow (ACFM) Zone 2 | 546 | 544 | 545 | 614 | 615 |
| Air Flow (ACFM) Zone 3 | 491 | 491 | 492 | 491 | 491 |
| Fluidizing Velocity (FPM) Zone 1 | 170 | 170 | 170 | 174 | 175 |
| Fluidizing Velocity (FPM) Zone 2 | 152 | 152 | 152 | 171 | 171 |
| Fluidizing Velocity (FPM) Zone 3 | 137 | 137 | 137 | 137 | 137 |
| Inlet Air Temperature (° F.) Zone 1 | 149 | 150 | 151 | 156 | 156 |
| Inlet Air Temperature (° F.) Zone 2 | 126 | 125 | 126 | 128 | 128 |
| Inlet Air Temperature (° F.) Zone 3 | 54 | 54 | 54 | 55 | 56 |

The weight percent water in the agglomerated intermediate 20 exiting the mixer 110, based on the total weight of the agglomerated intermediate 20, and the weight percent water in the dried agglomerated intermediate 24 exiting the dryer 22, based on the total weight of the dried agglomerated intermediate 24 are presented in Table 9 below for Examples 3–7:

TABLE 9

| Property | Value For Property | | | | |
|---|---|---|---|---|---|
| | Ex. 3 | Ex. 4 | Ex. 5 | Ex. 6 | Ex. 7 |
| Agglomerated Intermediate 20 (wt % water) | 4.8 | 5.1 | 4.8 | 4.6 | 4.7 |
| Dried Agglomerated Intermediate 24 (wt % water) | 2.8 | 2.9 | 2.7 | 2.7 | 2.1 |

Samples of the dried agglomerated intermediate 24 produced in Examples 3–7, were subjected to wettability, dispersability, sedimentation, solubility, and fat separation analyses, as described in the analytical methods and property determination section of this document. The dried agglomerated intermediate 24 samples used in the wettability, dispersability, sedimentation, solubility, and fat separation analyses were stored under refrigeration prior to testing and were therefore at a temperature on the order of about 35° F. to about 45° F. when tested. The results of these tests for Examples 3–7 are presented in Table 10 below:

Each of Examples 3–7 had a sedimentation rating of "0.5 to 1", which generally indicates no, or only slight, sedimentation upon rehydration. These sedimentation results were excellent since the desired sediment rating is 0 to less than 1 in 0% to 90% of the samples tested. Examples 3–7 were each rated at "none" or "minimal" for the solubility test, which generally indicates that little, if any, undissolved particles were observed. The sedimentation results for Examples 3–7 were therefore excellent, since the desired solubility is a rating of moderate or below.

TABLE 10

| PROPERTY | EXAMPLE 3 | EXAMPLE 4 | EXAMPLE 5 | EXAMPLE 6 | EXAMPLE 7 |
| --- | --- | --- | --- | --- | --- |
| Wettability Rating | 0 to 25% @ 30 seconds | 25% to 50% @ 30 seconds | 75% @ 30 seconds | 0% @ 30 seconds | 0% @ 30 seconds |
| Dispersability Rating | 0 | 0 | 0 | 1 to 1.5 | 1 |
| Sedimentation Rating | 0.5 or less | 0.5 or less | 0.5 or less | 0.5 or less | 0.5 or less |
| Solubility Rating | None | None | None | None | None to minimal |
| Fat Separation (mm) | 17–20 mm after 150 minutes | 8–10 mm after 150 minutes | 8 mm after 150 minutes | 17–20 mm after 16 hours | 16–18 mm after 150 minutes |
| Total Sample Height (mm) | 225 | 225 | 225 | 225 | 225 |
| Fat Separation (volume %) | 7.5 to 8.9 | 3.5 to 4.4 | 3.5 | 7.5 to 8.9 | 7.1 to 8.0 |

Examples 4 and 5 exhibited excellent minimization of fat separation upon rehydration since the volume percent of fat separation in each of Examples 4–5 is substantially reduced as compared to the volume percent of fat separation (at least about 7 volume percent to about 9 volume percent, or more) typically observed in prior art milk replacers. These excellent results for fat separation minimization in Examples 4 and 5 demonstrate the surprising benefit of incorporating both (1) a solution of lecithin in fat and (2) a blend of fluid soy lecithin, propylene glycol, ethoxylated monoglycerides, and ethoxylated diglycerides, added via different injectors, as the emulsifying agent 18 when producing the agglomerated intermediate 20 and derivatives thereof. On the other hand, Example 3, which relied on a different substance as the emulsifying agent 18, and Examples 6–7, which employed sugar solutions as an additional agglomerating agent 16 instead of using any emulsifying agent 18, each exhibited poor minimization of fat separation upon rehydration. Specifically, the volume percent of fat separation in each of Examples 3 and 6–7 was about the same as the volume percent of fat separation observed when using some prior art milk replacers (at least about 7 volume percent to about 9 volume percent, or more).

The wettability results for Examples 3–4 and 6–7 were poor since 50% or less of the dried particles of each dried agglomerated intermediate 24 sample were fully wetted within about 30 seconds. The wettability results for Example 5 were good since at least 75% of the dried agglomerated intermediate 24 samples were fully wetted within about 30 seconds or less. No floating lumps were observed during the dispersability testing of Examples 3–5 and each of Examples 3–5 therefore exhibited a "0" rating. These results were excellent, since the desired dispersability rating is to obtain a rating of 0.5 or below, in 0 to 90% of all the samples. On the other hand, floating lumps were observed during the dispersability testing of Examples 6 and 7 and Examples 6 and 7 were therefore rated "1 to 1.5" and "1" respectively for the dispersability test. While not preferred, these dispersability results for Examples 6 and 7 were acceptable.

Examples 8–9

Examples 8 and 9 illustrate preparation of the agglomerated milk replacer product in accordance with the present invention using atomized water as the agglomerating agent 16 and either (1) a liquid fat-based blend or (2) a mixture of fluid soy lecithin, propylene glycol, ethoxylated monoglycerides, and ethoxylated diglycerides as the emulsifying agent 18. The powdered nutritional composition 12 used in both Example 8 and Example 9 included about 27 to about 31 weight percent fat base, about 68 to about 72 weight percent protein blend, and 0 to about 2 weight percent dietary additives.

The protein blend was formed of proteinaceous ingredients previously described above in relationship to the powdered nutritional composition 12. The fat base of Examples 8–9 was formed entirely from "13-60 WPC/whey" fat base component. The "13-60 WPC/whey" fat base component included about 60 weight percent fat (primarily as lard), about 40 weight percent of a blend of whey protein concentrate and whey and about 0.6 weight percent casein, based upon the total weight of the "13-60 WPC/whey" fat base component. The casein concentration along with the ratio of whey protein concentrate to whey in the "13-60 WPC/whey" fat base component were selected to provide the "13-60 WPC/whey" fat base component with a total protein concentration of about 13 weight percent, based upon the total weight of the "13-60 WPC/whey" fat base component.

The casein concentration in the "13-60 WPC/whey" fat base component along with the concentration of the "13-60 WPC/whey" fat base component in the powdered nutritional composition 12 were selected to provide the powdered nutritional composition 12 with a casein concentration of about 0.2 weight percent, based upon the total weight of the powdered nutritional composition 12. Casein is the protein precipitated by acidifying skim milk to a pH value of about 4.6 at a milk temperature of about 20° C. The powdered nutritional composition 12 used in Examples 8 and 9 and the operating conditions in the mixer 110 and in the dryer 22 caused the classified milk replacer product 28 to have the following cumulative percent retention values: about 2.3 weight percent+40 mesh, about 12.5 weight percent+70 mesh, about 37.3 weight percent+140 mesh, and about 90.8 weight percent+400 mesh, based on the total weight of the classified milk replacer product 28, where "mesh" refers to the Bureau of Standards Sieve number.

The powdered nutritional composition 12 was introduced into the agglomerating mixer 110 via one of the tubular feed ports 148, namely the first tubular feed port 148a, at a rate of about 640 pounds per hour in these examples. The powdered nutritional composition 12 used in Example 8 and 9 had a moisture concentration of about 2.1 weight percent, based on the total weight of the powdered nutritional composition 12, and a loose bulk density of about 33 pounds per cubic feet.

Pneumatically atomized water, the agglomerating agent 16 in Examples 8–9, was injected into the mixer 110 using the first injector 182a and the second injector 182b. The nozzle head 190 used to atomize the water and introduce the atomized water into the mixer 110 in both Example 8 and Example 9 was round spray nozzle Set-Up No. SU12 that is available from Spraying Systems Co. of Wheaton, Ill. The air was supplied to the Set-Up No. SU12 spray nozzle at a pressure of about 45 psig and a temperature of about 70° F. separately from the water through pneumatic tubing. The water that was atomized was supplied at a pressure of about 50 psig and a temperature of about 60° F. In Example 8, the flow rate of liquid water that was atomized to form the agglomerating agent 16 was about 4.5 gallons per minute, and in Example 9 the flow rate of liquid water that was atomized to form the agglomerating agent 16 was about 5.5 gallons per minute.

Two different liquid fat blends were used as the emulsifying agent 18 in these examples. In Example 8, the emulsifying agent 18 was a mixture of about 94 weight percent lard and about 6 weight percent crude lecithin, based on the total weight of the emulsifying agent 18. The crude lecithin is available from Archer Daniels Midland Co. of Decatur, Ill. as Yelkin crude soya lecithin. In Example 9, the emulsifying agent 18 was a blend of about 47 weight percent lard, about 3 weight percent lecithin, and 50 weight percent of the MAXEMUL 210 blend of fluid soy lecithin, propylene glycol, ethoxylated monoglycerides and ethoxylated diglycerides.

In Examples 8–9, the emulsifying agent 18 was heated to a range of about 120° F. to about 130° F. to prevent the emulsifying agent 18 from solidifying while being injected into the mixer 110. In Examples 8–9, the emulsifying agent 18 was atomized with hot air that had a pressure of about 30 psig and a temperature of about 220° F. using spray nozzle Set-Up No. SUE28A that is available from Spraying Systems Co. of Wheaton, Ill. as the nozzle head 190. The emulsifying agent 18 was injected into the agglomerating mixer 110 using the third injector 182c at a flow rate of about 1 part by weight of emulsifying agent 18 per 100 parts by weight of the powdered nutritional composition 12 in each of Examples 8–9. Thus, the actual feed rate of the emulsifying agent 18 into the agglomerating mixer 110 was about 6 pounds per hour in Examples 8–9.

After exiting the agglomerating mixer 110, the agglomerated intermediate 20 produced in Examples 8 and 9 was introduced into the dryer 22. The operating conditions for the dryer in Examples 8–9 are presented in Table 11 below:

TABLE 11

| Operating Variable | Value for Operating Variable | |
|---|---|---|
| | Example 8 | Example 9 |
| Air Flow (ACFM) Zone 1 | 611 | 608 |
| Air Flow (ACFM) Zone 2 | 513 | 492 |
| Air Flow (ACFM) Zone 3 | 496 | 496 |
| Fluidizing Velocity (FPM) Zone 1 | 170 | 169 |
| Fluidizing Velocity (FPM) Zone 2 | 143 | 137 |
| Fluidizing Velocity (FPM) Zone 3 | 138 | 138 |
| Inlet Air Temperature (° F.) Zone 1 | 179 | 165 |
| Inlet Air Temperature (° F.) Zone 2 | 149 | 139 |
| Inlet Air Temperature (° F.) Zone 3 | 71 | 71 |

The agglomerated intermediate 20 had a concentration of water of about 6.1 weight percent in Example 8 and about 6.7 weight percent in Example 9, based on the total weight of the agglomerated intermediate 20. The dried agglomerated intermediate 24 had a water content of about 3.2 weight percent in Example 8 and about 3.4 weight percent in Example 9, based on the total weight of the dried agglomerated intermediate 24.

Monitoring was conducted to determine the screen oversize rate in Example 9. In Example 9, the screen of the Kason screener was a Bureau of Standards Sieve No. 12. In Example 9, the screen yielded an oversize rate of about 7.9 weight percent oversize particles, based on the total weight of the dried agglomerated intermediate 24.

Samples of the dried agglomerated intermediate 24 produced in Examples 8–9 were subjected to wettability, dispersability, sedimentation, solubility and fat separation analyses, as described in the analytical methods and property determination section of this document. The dried agglomerated intermediate 24 samples used in the wettability, dispersability, sedimentation, solubility, and fat separation analyses were stored under refrigeration prior to testing and were therefore at a temperature on the order of about 35° F. to about 45° F. when tested. All analyses for Examples 8–9 were conducted on triplicate assays except for the fat separation analysis. The results of these tests for Examples 8–9 are presented in Table 12 below:

TABLE 12

| PROPERTY | EXAMPLE 8 | EXAMPLE 9 |
|---|---|---|
| Wettability Rating | 100% @ 20–25 seconds | 100% @ 7–8 seconds |
| Dispersability Rating | 0 | 0 |
| Sedimentation Rating | 0.5 or less | 0.5 or less |
| Solubility Rating | Minimal to moderate (soft) | Minimal to moderate (soft) |
| Fat Separation (mm) | 7–9 mm after 6 hours | 5 mm after 6 hours |
| Total Sample Height (mm) | 225 | 225 |
| Fat Separation (volume %) | 3.1 to 4.0 | 2.2 |

The wettability results for Examples 8–9 were good to excellent since 100% of the dried agglomerated intermediate 24 samples were fully wetted within about 20 to 25 seconds in Example 8 and within about 7–8 seconds in Example 9. No floating lumps were observed during the dispersability test and each of Examples 8–9 therefore exhibited a "0" rating. These results were excellent, since the desired dispersability rating is to obtain a rating of 0.5 or below, in 0 to 90% of all the samples.

Each of Examples 8–9 had a sedimentation rating of "0.5 to 1", which generally indicates no, or only slight, sedimentation upon rehydration. These sedimentation results were excellent since the desired sediment rating is 0 to less than 1 in 0% to 90% of the samples tested. Examples 8–9 were each rated at either "minimal" or "moderate" for the solubility test and had "soft" sediment particles. The solubility results for Examples 8–9 were therefore excellent, since the desired solubility is a rating of moderate or below.

Furthermore, the volume percent of fat separation upon rehydration in each of Examples 8–9 is excellent since the volume percent of fat separation in each of Examples 8–9 is greatly reduced as compared to the volume percent of fat separation typically observed in prior art milk replacers (at least about 7 volume percent to about 9 volume percent, or more).

Example 10

This example illustrates preparation of the agglomerated milk replacer product in accordance with the present invention using atomized water and atomized steam as the agglomerating agents 16 and a blend of liquid fat with a mixture of fluid soy lecithin, propylene glycol, ethoxylated monoglycerides, and etholyxated diglycerides as the emulsifying agent 18. The powdered nutritional composition 12 used in Example 10 had the same composition and components as the powdered nutritional composition 12 that was used in Examples 8–9.

The powdered nutritional composition 12 was introduced into the agglomerating mixer 110 via one of the tubular feed ports 148, namely the first tubular feed port 148a, at a rate of about 660 pounds per hour. The powdered nutritional composition 12 that was used in this example had a concentration of water of about 2 weight percent, based on the total weight of the powdered nutritional composition 12, and a loose bulk density of about 32.7 pounds per cubic feet.

Pneumatically atomized water and atomized steam were used as the agglomerating agents 16 in Example 10. The pneumatically atomized water was introduced into the agglomerating mixer 110 through two of the four injectors 182, namely the second injector 182b and the third injector 182c, and the atomized steam was introduced into the agglomerating mixer 110 through one of the four injectors 182, namely the fourth injector 182d.

The nozzle head 190 used to atomize the water and introduce the atomized water into the mixer 110 in Example 10 was round spray nozzle Set-Up No. SU22B that is available from Spraying Systems Co. of Wheaton, Ill. The air was supplied to the Set-Up No. SU22B spray nozzle at a pressure of about 50 psig and a temperature of about 70° F., separately from the water, through pneumatic tubing. The water was supplied to the Set-Up No. SU22B spray nozzle at a pressure of about 15 psig and a temperature of about 60° F. In Example 10, the flow rate of liquid water that was atomized to form the agglomerating agent 16 was about 23 pounds per hour.

The nozzle head 190 used to introduce atomized steam into the agglomerating mixer 110 in Example 10 was a modified Fluid Cap No. 100150 that is available from Spraying Systems Co. of Wheaton, Ill. The modifications, which were done onsite during testing, consisted of enlarging the orifice of the cap to about 5/32 inch in diameter. In Example 10, steam pressure # 1 was about 20 psig, steam pressure # 2 was about 5 psig, and the steam temperature was about 290° F.

The emulsifying agent 18 in this example was a mixture of about 47 weight percent lard, about 3 weight percent crude lecithin, and about 50 weight percent of the MAX-EMUL 210 blend of fluid soy lecithin, propylene glycol, ethoxylated monoglycerides and ethoxylated diglycerides. The crude lecithin is available from Archer Daniels Midland Co. of Decatur, Ill. as Yelkin crude soya lecithin. The emulsifying agent 18 was heated to a range of about 120° F. to about 130° F. to prevent solidification while pumping the emulsifying agent 18 into the agglomerating mixer 110. The emulsifying agent 18 was atomized using hot air that had a pressure of about 30 psig and a temperature about 220 ° F. The nozzle head 190 used to atomize the emulsifying agent and introduce the atomized emulsifying agent into the mixer 110 through one of the injectors 182, namely the first injector 182a, was round spray nozzle Set-Up No. SUE18 that is available from Spraying Systems Co. of Wheaton, Ill. The emulsifying agent 18 was injected into the agglomerating mixer 110 at a flow rate of about 1 part by weight of emulsifying agent 18 per 100 parts by weight of the powdered nutritional composition 12 in this example. The actual feed rate of the emulsifying agent 18 into the agglomerating mixer 110 was about 6 pounds per hour in Example 10.

After exiting the agglomerating mixer 110, the agglomerated intermediate 20 produced in Example 10 was introduced into the dryer 22. The operating conditions for the dryer 22 in Example 10 are presented in Table 13 below:

TABLE 13

| Operating Variable | Example 10 |
| --- | --- |
| Air Flow (ACFM) Zone 1 | 525 |
| Air Flow (ACFM) Zone 2 | 534 |
| Air Flow (ACFM) Zone 3 | 544 |
| Fluidizing Velocity (FPM) Zone 1 | 146 |
| Fluidizing Velocity (FPM) Zone 2 | 249 |
| Fluidizing Velocity (FPM) Zone 3 | 154 |
| Inlet Air Temperature (° F.) Zone 1 | 161 |
| Inlet Air Temperature (° F.) Zone 2 | 154 |
| Inlet Air Temperature (° F.) Zone 3 | 57 |

In Example 10, the agglomerated intermediate 20 had a concentration of water of about 5.6 weight percent, based upon the total weight of the agglomerated intermediate 20, and a temperature of about 100° F. as the agglomerated intermediate 20 exited the mixer 110. The dried agglomerated intermediate 24 had a concentration of water of about 2.6 weight percent, based upon the total weight of the dried agglomerated intermediate 24, in Example 10. The loose bulk density of the dried agglomerated intermediate 24 was about 24.7 pounds per cubic feet in Example 10. The dried agglomerated intermediate 24 produced in Example 10 had the following cumulative retention values: 0.05 weight percent+8 mesh, 0.36 weight percent+12 mesh, 7.61 weight percent+20 mesh, 27.82 weight percent+40 mesh, 90.4 weight percent+70 mesh, and 99.95 weight percent+140 mesh based on the total weight of the dried agglomerated intermediate 24, where "mesh" refers to the Bureau of Standards Sieve number.

Observation of the fines generation rate was conducted in Example 10. The screen that was inserted in the stream of the fluidizing air that was exhausted from the dryer 12 was a Bureau of Standards Sieve Number 140 mesh screen from the U.S. Standard Sieve Series. In Example 10, about 13.3 weight percent fine particles, based on the total weight of the dried agglomerated intermediate 24, were recovered from the dryer.

Samples of the dried agglomerated intermediate 24 produced in Example 10, were subjected to wettability, dispersability, sedimentation, solubility and fat separation analyses, as described in the analytical methods and property determination section of this document. The dried agglomerated intermediate 24 samples used in the wettability, dispersability, sedimentation, solubility, and fat separation analyses were stored under refrigeration prior to testing and were therefore at a temperature on the order of about 35° F. to about 45° F. when tested. The results of these tests for Example 10 are presented in Table 14 below:

TABLE 14

| PROPERTY | EXAMPLE 10 |
| --- | --- |
| Wettability | 100% @ 5 to 7 seconds |
| Dispersability | 0 |
| Sedimentation Rating | 0.5 |
| Solubility Rating | Minimal to moderate |
| Fat Separation | 7–8 mm after 23 hours |
| Total Sample Height (mm) | 225 |
| Fat Separation | 3.1 to 3.5 |

The results of the wettability testing for Example 10 were excellent since 100% of the dried agglomerated intermediate 24 samples of Example 10 were fully wetted within about 5 to about 7 seconds or less. When the Example 10 samples of the dried agglomerated intermediate 24 were tested using the dispersability testing procedure, no floating lumps were observed on top of the solution in the test container and each of the nine samples therefore exhibited a "0" rating. These results were excellent, since the desired dispersability rating is to obtain a rating of 0.5 or below, in 0 to 90% of all the samples.

When the same samples of dried agglomerated intermediate 24 were subjected to the sediment testing procedure, each of the samples had a rating of "0.5", which generally indicates little, if any, sedimentation upon rehydration. These sedimentation results were excellent since the desired sediment rating is 0 to less than 1 in 0% to 25% of the samples tested. When the Example 10 samples of the dried agglomerated intermediate 24 were subjected to the solubility testing procedure, the samples each were rated at "minimal" or "moderate" and the sediment particles were observed to have no texture. The sedimentation results for these samples were therefore excellent, since the desired solubility is a rating of moderate or below. Furthermore, the volume percent of fat separation upon rehydration in Example 10 is excellent since the volume percent of fat separation in Example 10 is greatly reduced as compared to the volume percent of fat separation typically observed in prior art milk replacers (at least about 7 volume percent to about 9 volume percent, or more).

Although the present invention has been described with reference to preferred embodiments, workers skilled in the art will recognize that changes may be made in form and detail without departing from the spirit and scope of the invention.

What is claimed is:

1. A method of producing a milk replacer product, the method comprising:

creating a pattern of air flow in a mixing zone of a mixer;

gravity feeding a powdered nutritional composition into the mixing zone;

applying an agglomerating aid to particles of the powdered nutritional composition in the mixing zone, the agglomerating aid, in combination with the pattern of air flow, effective to cause particles of the powdered nutritional composition to stick together and form agglomerates;

forming a coating in each agglomerate, the coating comprising an emulsifying agent; and drying the agglomerates to form the milk replacer product.

2. The method of claim 1 where the coating is formed between and around particles of the powdered nutritional composition that are incorporated in each agglomerate, the coating effective to bond the particles together in each agglomerate.

3. The method of claim 2 wherein, absent the coating, particles adjacent to each other in each agglomerate would define gaps and crevices in each agglomerate, the coating at least substantially filling in at least substantially all of the gaps and crevices and the coating forming a bridge between particles adjacent to each other in each agglomerate.

4. The method of claim 2 wherein:

the coating is at least substantially continuous; and the coating is effective to give each agglomerate a substantially globular shape.

5. The method of claim 1 wherein the emulsifying agent comprises animal fat and lecithin.

6. The method of claim 1 wherein the emulsifying agent comprises lard and lecithin.

7. The method of claim 1 wherein the emulsifying agent comprises animal fat, polyethylene glycol, propylene glycol, a monoglyceride, a diglyceride, or any combination of any of these.

8. A method of producing a milk replacer product, the method comprising:

creating a pattern of air flow in a mixing zone of a mixer;

gravity feeding a powdered nutritional composition into the mixing zone;

applying an agglomerating aid to particles of the powdered nutritional composition in the mixing zone, the agglomerating aid, in combination with the pattern of air flow, effective to cause particles of the powdered nutritional composition to stick together and form agglomerates; and drying the agglomerates to form the milk replacer product, the milk replacer product, when rehydrated at the ratio of 100 grams of the milk replacer product to 350 milliliters of water and allowed to rest for at least about 60 minutes, exhibits about 6 volume percent, or less, of fat separation, based upon the total volume of the rehydrated milk replacer product.

9. A method of producing a milk replacer product, the method comprising:

creating a pattern of air flow in a mixing zone of a mixer;

gravity feeding a powdered nutritional composition into the mixing zone;

applying an agglomerating aid to particles of the powdered nutritional composition in the mixing zone, the agglomerating aid, in combination with the pattern of air flow, effective to cause particles of the powdered nutritional composition to stick together and form agglomerates; and drying the agglomerates to form the milk replacer product, wherein:

the concentration of fat in the milk replacer product ranges from about 25 weight percent to about 52 weight percent, based on the total weight of the milk replacer product; and the concentration of total solids in the rehydrated milk replacer product ranges from about 10 weight percent to about 20 weight percent, based on the total weight of the rehydrated milk replacer product.

10. A method of producing a milk replacer product, the method comprising:

creating a pattern of air flow in a mixing zone of a mixer;

gravity feeding a powdered nutritional composition into the mixing zone, the powdered nutritional composition comprising:
  a proteinaceous ingredient; and
  a fat base, the fat base comprising fat, the fat selected from animal fat, vegetable fat, fatty acid, and any of these in any combination;

applying an agglomerating aid to particles of the powdered nutritional composition in the mixing zone, the agglomerating aid, in combination with the pattern of air flow, effective to cause particles of the powdered nutritional composition to stick together and form agglomerates; and drying the agglomerates to form the milk replacer product.

11. The method of claim 10 wherein the fat base further comprises an additional substance, the additional substance selected from the group consisting of sugar, starch, water, protein, an emulsifying agent, and any of these in any combination.

12. The method of claim 10 wherein the powdered nutritional composition further comprises an emulsifying agent, the emulsifying agent selected from the group consisting of animal fat, lecithin, polyethylene glycol, propylene glycol, a monoglyceride, a diglyceride, and any combination of any of these.

13. The method of claim 12 wherein:

the monoglyceride is selected from the group consisting of an ethoxylated monoglyceride of an edible $C_{12}$–$C_{24}$ fatty acid, a distilled monoglyceride of an edible $C_{12}$–$C_{24}$ fatty acid, and any of these in any combination; and the diglyceride is selected from the group consisting of an ethoxylated diglyceride of an edible $C_{12}$–$C_{24}$ fatty acid, a distilled diglyceride of an edible $C_{12}$–$C_{24}$ fatty acid, and any of these in any combination.

14. The method of claim 10 wherein the powdered nutritional composition further comprises an emulsifying agent that comprises animal fat, polyethylene glycol, propylene glycol, a monoglyceride, a diglyceride, or any combination of any of these.

15. A method of producing a milk replacer product, the method comprising:

creating a pattern of air flow in a mixing zone of a mixer;

gravity feeding a powdered nutritional composition into the mixing zone, the powdered nutritional composition comprising:
  about 20 weight percent to about 90 weight percent of a proteinaceous ingredient, based upon the total weight of the powdered nutritional composition;
  about 5 weight percent to about 55 weight percent fat, based upon the total weight of the powdered nutritional composition; and
  0 weight percent to about 8 weight percent water; based upon the total weight of the powdered nutritional composition;

applying an agglomerating aid to particles of the powdered nutritional composition in the mixing zone, the agglomerating aid, in combination with the pattern of air flow, effective to cause particles of the powdered nutritional composition to stick together and form agglomerates; and drying the agglomerates to form the milk replacer product.

16. A method of producing a milk replacer product, the method comprising:

creating a pattern of air flow in a mixing zone of a mixer;

gravity feeding a powdered nutritional composition into the mixing zone;

applying an agglomerating aid to particles of the powdered nutritional composition in the mixing zone, the agglomerating aid, in combination with the pattern of air flow, effective to cause particles of the powdered nutritional composition to stick together and form agglomerates, wherein applying the agglomerating aid to the powdered nutritional composition comprises:
  applying water to the powdered nutritional composition; and
  applying steam to the powdered nutritional composition, the steam applied after applying the water; and drying the agglomerates to form the milk replacer product.

17. A method of producing a milk replacer product, the method comprising:

creating a pattern of air flow in a mixing zone of a mixer;

gravity feeding a powdered nutritional composition into the mixing zone;

mixing an emulsifying agent with the powdered nutritional composition, the emulsifying agent selected from the group consisting of animal fat, lecithin, polyethylene glycol, propylene glycol, a monoglyceride, a diglyceride, and any combination of any of these;

applying an agglomerating aid to particles of the powdered nutritional composition in the mixing zone, the agglomerating aid, in combination with the pattern of air flow, effective to cause particles of the powdered nutritional composition to stick together and form agglomerates; and drying the agglomerates to form the milk replacer product.

18. A method of agglomerating a powdered nutritional composition, the method comprising:

dispersing an agglomerating agent in a region of agitated air flow within a mixing apparatus, the agglomerating aid comprising water;

dispersing an emulsifying agent in the region of agitated air flow within the mixing apparatus, the emulsifying agent dispersed separately from the agglomerating agent, dispersing particles of the powdered nutritional composition in the region of agitated air flow within the mixing apparatus; and coating particles of the powdered nutritional composition with the agglomerating agent and the emulsifying agent, the agitated air flow effective to agglomerate the coated particles and create particles of an intermediate mixture.

19. The method of claim 18 wherein particles of the intermediate mixture comprise a coating, the coating comprising the emulsifying agent.

20. The method of claim 19 where the coating is formed between and around particles of the powdered nutritional composition that are incorporated in each particle of the intermediate mixture, the coating effective to bond the particles of the powdered nutritional composition together in each particle of the intermediate mixture.

21. The method of claim 18, the method further comprising drying the intermediate mixture, cooling the intermediate mixture, or drying and cooling the intermediate mixture to form a milk replacer.

22. The method of claim 21 wherein the milk replacer, when rehydrated at the ratio of 100 grams of the milk replacer to 350 milliliters of water and allowed to rest for at least about 60 minutes, exhibits about 6 volume percent, or less, of fat separation, based upon the total volume of the rehydrated milk replacer.

23. The method of claim 22 wherein:
the concentration of fat in the milk replacer ranges from about 25 weight percent to about 52 weight percent, based on the total weight of the milk replacer; and
the concentration of total solids in the rehydrated milk replacer ranges from about 10 weight percent to about 20 weight percent, based on the total weight of the rehydrated milk replacer.

24. The method of claim 18 wherein the agglomerating agent is selected from the group consisting of water, steam, a combination of water and steam that are separately applied to the powdered nutritional composition, a sugar solution, and any of these in any combination.

25. The method of claim 18 wherein the powdered nutritional composition comprises:
a proteinaceous ingredient; and
a fat base, the fat base comprising fat, the fat selected from animal fat, vegetable fat, fatty acid, and any of these in any combination.

26. The method of claim 18, the method further comprising:
incorporating the emulsifying agent in the powdered nutritional composition, the emulsifying agent selected from the group consisting of steam, animal fat, lecithin, polyethylene glycol, propylene glycol, a monoglyceride, a diglyceride, and any combination of any of these.

27. A method of producing a milk replacer product, the method comprising:
placing a powdered nutritional composition in a mixer;
applying atomized water to the powdered nutritional composition in the mixer;
applying steam to the powdered nutritional composition in the mixer, the steam applied after applying the atomized water;
agglomerating the powdered nutritional composition in the mixer to produce particles of an agglomerated intermediate.

28. The method of claim 27, the method further comprising forming a coating in each particle of the agglomerated intermediate, the coating comprising an emulsifying agent, the coating effective to bond particles of the powdered nutritional composition together within each particle of the agglomerated intermediate.

29. A method of producing a milk replacer product, the method comprising:
placing a powdered nutritional composition in a mixer;
applying an agglomerating aid and an emulsifying agent to the powdered nutritional composition in the mixer;
agglomerating the powdered nutritional composition in the mixer to produce the milk replacer product, the milk replacer product, when rehydrated at the ratio of 100 grams of the milk replacer product to 350 milliliters of water and allowed to rest for at least about 60 minutes, exhibiting about 6 volume percent or less of fat separation, based upon the total volume of the rehydrated milk replacer product.

30. The method of claim 29 wherein the milk replacer product, when rehydrated at the ratio of 100 grams of the milk replacer product to 350 milliliters of water and allowed to rest for at least about 60 minutes, exhibits about 3 volume percent or less of fat separation, based upon the total volume of the rehydrated milk replacer product.

31. The method of claim 29 wherein the concentration of fat in the milk replacer product ranges from about 25 weight percent to about 52 weight percent, based on the total weight of the milk replacer product.

32. The method of claim 29 wherein:
the concentration of fat in the milk replacer product ranges from about 5 weight percent to about 52 weight percent, based on the total weight of the milk replacer product; and
the milk replacer product, when rehydrated at the ratio of 100 grams of the milk replacer product to 350 milliliters of water and allowed to rest for at least about 60 minutes, exhibits about 3 volume percent or less of fat separation, based upon the total volume of the rehydrated milk replacer product.

33. A milk replacer product, the milk replacer product comprising:
about 20 weight percent to about 90 weight percent of a proteinaceous ingredient, based upon the total weight of the milk replacer product;
about 5 weight percent to about 52 weight percent fat, based upon the total weight of the milk replacer product;
about 3.3 weight percent to about 9.5 weight percent water; based upon the total weight of the milk replacer product; and;
wherein the milk replacer product, when rehydrated at the ratio of 100 grams of the milk replacer product to 350 milliliters of water and allowed to rest for at least about 60 minutes, exhibits about 6 volume percent or less of fat separation, based upon the total volume of the rehydrated milk replacer product.

34. The milk replacer product of claim 33 wherein the concentration of fat in the milk replacer product ranges from about 25 weight percent to about 52 weight percent, based on the total weight of the milk replacer product.

35. The milk replacer product of claim 33 wherein the milk replacer product, when rehydrated at the ratio of 100 grams of the milk replacer product to 350 milliliters of water and allowed to rest for at least about 60 minutes, exhibits about 3 volume percent, or less, of fat separation, based upon the total volume of the rehydrated milk replacer product.

36. A milk replacer product, the milk replacer product comprising:
a proteinaceous ingredient;
fat; and
a coating, the coating comprising an emulsifying agent, the emulsifying agent comprising polyethylene glycol, propylene glycol, a monoglyceride, a diglyceride, or any combination of any of these, the coating effective to bond the proteinaceous ingredient and the fat within particles of the milk replacer product, the milk replacer product, when rehydrated at the ratio of 100 grams of the milk replacer product to 350 milliliters of water and allowed to rest for at least about 60 minutes, exhibiting about 3 volume percent, or less, of fat separation, based upon the total volume of the rehydrated milk replacer product.

37. The milk replacer product of claim 36 wherein the particles of the milk replacer product comprise particles of a powdered nutritional composition, the particles of the powdered nutritional composition comprising the proteinaceous ingredient and the fat, adjacent particles of the powdered nutritional composition within individual milk replacer particles, absent the coating, defining gaps and crevices, the coating at least substantially filling in at least substantially all of the gaps and crevices in individual milk replacer particles and the coating forming a bridge between adjacent particles of the powdered nutritional composition in the individual milk replacer particles.

38. The milk replacer product of claim 36 wherein:
   the coating is at least substantially continuous; and
   the coating is effective to give individual particles of the milk replacer product a substantially globular shape.

39. A milk replacer product, the milk replacer product comprising:
   about 20 weight percent to about 90 weight percent of a proteinaceous ingredient, based upon the total weight of the milk replacer product;
   about 5 weight percent to about 52 weight percent fat, based upon the total weight of the milk replacer product; and
   wherein the milk replacer product is in the form of particles, the particles of the milk replacer product comprising the fat, the proteinaceous ingredient, and the coating, the coating comprising an emulsifying agent, the coating surrounding the fat, the coating extending between the fat and the proteinaceous ingredient, and the coating effective to secure the fat and the proteinaceous ingredient within each particle of the milk replacer product.

40. The milk replacer product of claim 39 wherein the milk replacer product, when rehydrated at the ratio of 100 grams of the milk replacer product to 350 milliliters of water and allowed to rest for at least about 60 minutes, exhibits about 6 volume percent, or less, of fat separation, based upon the total volume of the rehydrated milk replacer product, when the concentration of fat in the milk replacer product ranges from about 25 weight percent to about 52 weight percent, based on the total weight of the milk replacer product.

41. A method of producing a milk replacer product, the method comprising:
   creating a pattern of air flow in a mixing zone of a mixer;
   gravity feeding a powdered nutritional composition into the mixing zone;
   applying an agglomerating aid to the particles of the powdered nutritional composition in the mixing zone, the agglomerating aid, in combination with the pattern of air flow, effective to cause particles of the powdered nutritional composition to stick together and form agglomerates, the agglomerates exiting the mixer at a temperature of about 75° F. to about 100° F.; and
   drying the agglomerates to form the milk replacer product.

42. A method of producing a milk replacer product, the method comprising:
   creating a pattern of air flow in a mixing zone of a mixer;
   gravity feeding a powdered nutritional composition into the mixing zone;
   applying an agglomerating aid to the particles of the powdered nutritional composition in the mixing zone, the agglomerating aid, in combination with the pattern of air flow, effective to cause particles of the powdered nutritional composition to stick together and form agglomerates; and
   drying the agglomerates outside of the mixer to form the milk replacer product.

43. A method of producing a milk replacer product, the method comprising:
   creating a pattern of air flow in a mixing zone of a mixer;
   gravity feeding a powdered nutritional composition into the mixing zone, the powdered nutritional composition comprising:
      a proteinaceous ingredient; and
      a fat base, the fat base comprising fat and an additional substance, the additional substance comprising sugar, starch, or any combination of sugar and starch;
   applying an agglomerating aid to the particles of the powdered nutritional composition in the mixing zone, the agglomerating aid, in combination with the pattern of air flow, effective to cause particles of the powdered nutritional composition to stick together and form agglomerates; and
   drying the agglomerates to form the milk replacer product.

44. A method of producing a milk replacer product, the method comprising:
   creating a pattern of air flow in a mixing zone of a mixer;
   gravity feeding a powdered nutritional composition into the mixing zone;
   applying an agglomerating aid to the particles of the powdered nutritional composition in the mixing zone wherein:
      the agglomerating aid comprises water and steam that are sequentially applied to the powdered nutritional composition, a sugar solution, or any of these in any combination;
      the agglomerating aid, in combination with the pattern of air flow, is effective to cause particles of the powdered nutritional composition to stick together and form agglomerates; and
   drying the agglomerates to form the milk replacer product.

45. A method of producing a milk replacer product, the method comprising:
   creating a pattern of air flow in a mixing zone of a mixer;
   gravity feeding a powdered nutritional composition into the mixing zone;
   applying an agglomerating aid to the particles of the powdered nutritional composition in the mixing zone wherein:
      the agglomerating aid comprises water and steam that are separately applied to the powdered nutritional composition, a sugar solution, or any of these in any combination;
      the agglomerating aid, in combination with the pattern of air flow, is effective to cause particles of the powdered nutritional composition to stick together and form agglomerates; and
   drying the agglomerates to form the milk replacer product.

46. A method of producing a milk replacer product, the method comprising:
creating a pattern of air flow in a mixing zone of a mixer;
gravity feeding a powdered nutritional composition into the mixing zone;
applying an agglomerating aid to the particles of the powdered nutritional composition in the mixing zone wherein:
the agglomerating aid comprises water;
the agglomerating aid, in combination with the pattern of air flow, is effective to cause particles of the powdered nutritional composition to stick together and form agglomerates;
applying an emulsifying agent to the particles of the powdered nutritional composition in the mixing zone, the agglomerating aid and the emulsifying agent sequentially applied to the particles of the powdered nutritional composition; and
drying the agglomerates to form the milk replacer product.

47. A method of agglomerating a powdered nutritional composition, the method comprising:
dispersing an agglomerating agent, an emulsifying agent, and particles of the powdered nutritional composition in a region of agitated air flow within a mixing apparatus;
coating particles of the powdered nutritional composition with the agglomerating agent and the emulsifying agent, the agitated air flow effective to agglomerate the coated particles and create particles of an intermediate mixture; and
drying or cooling the intermediate mixture to form a milk replacer; wherein:
the concentration of fat in the milk replacer ranges from about 5 weight percent to about 52 weight percent, based on the total weight of the milk replacer; and
the milk replacer, when rehydrated at the ratio of 100 grams of the milk replacer to 350 milliliters of water and allowed to rest for at least about 60 minutes, exhibits about 3 volume percent, or less, of fat separation, based upon the total volume of the rehydrated milk replacer.

48. A method of agglomerating a powdered nutritional composition, the method comprising:
dispersing an agglomerating agent, an emulsifying agent, and particles of the powdered nutritional composition in a region of agitated air flow within a mixing apparatus; and
coating particles of the powdered nutritional composition with the agglomerating agent and the emulsifying agent, the agitated air flow effective to agglomerate the coated particles and create particles of an intermediate mixture;
wherein the agglomerating aid and the emulsifying agent are sequentially applied to the particles of the powdered nutritional composition.

49. A method of agglomerating a powdered nutritional composition, the method comprising:
dispersing an agglomerating agent, a first emulsifying agent, and particles of the powdered nutritional composition in a region of agitated air flow within a mixing apparatus,
the powdered nutritional composition comprising:
a proteinaceous ingredient; and
a fat base, the fat base comprising fat and a second emulsifying agent; and
coating particles of the powdered nutritional composition with the agglomerating agent and the first emulsifying agent, the agitated air flow effective to agglomerate the coated particles and create particles of an intermediate mixture.

50. A method of agglomerating a powdered nutritional composition, the method comprising:
dispersing an agglomerating agent, a first emulsifying agent, and particles of the powdered nutritional composition in a region of agitated air flow within a mixing apparatus,
the powdered nutritional composition comprising:
a proteinaceous ingredient; and
sugar, corn syrup, starch, a second emulsifying agent, or any of these in any combination, the sugar selected from the group consisting of glucose, fructose, sucrose, galactose and any of these in any combination; and
coating particles of the powdered nutritional composition with the agglomerating agent and the first emulsifying agent, the agitated air flow effective to agglomerate the coated particles and create particles of an intermediate mixture.

51. The method of claim 50 wherein the emulsifying agent comprises animal fat, lecithin, polyethylene glycol, propylene glycol, a monoglyceride, a diglyceride, or any combination of any of these.

52. A method of agglomerating a powdered nutritional composition, the method comprising:
dispersing an agglomerating agent and particles of the powdered nutritional composition in a region of agitated air flow within a mixing apparatus wherein:
the powdered nutritional composition comprises:
a proteinaceous ingredient;
a fat base, the fat base comprising fat, the fat comprising animal fat, vegetable fat, fatty acid, or any of these in any combination;
an emulsifying agent, the emulsifying agent comprising polyethylene glycol, propylene glycol, a monoglyceride, a diglyceride, or any combination of any of these; and
coating particles of the powdered nutritional composition with the agglomerating agent, the agitated air flow effective to agglomerate the coated particles and create particles of an intermediate mixture.

53. A method of agglomerating a powdered nutritional composition, the method comprising:
dispersing an agglomerating agent an emulsifying agent, and particles of the powdered nutritional composition in a region of agitated air flow within a mixing apparatus;
coating particles of the powdered nutritional composition with the agglomerating agent and the emulsifying agent, the agitated air flow effective to agglomerate the coated particles and create particles of an intermediate mixture; and
drying the intermediate mixture, cooling the intermediate mixture, or drying and cooling the intermediate mixture to form a milk replacer, wherein:
the concentration of fat in the milk replacer ranges from about 25 weight percent to about 52 weight percent, based on the total weight of the milk replacer;
the milk replacer, when rehydrated at the ratio of 100 grams of the milk replacer to 350 milliliters of water and allowed to rest for at least about 60 minutes, exhibits about 6 volume percent, or less, of fat separation, based upon the total volume of the rehydrated milk replacer; and the concentration of total solids in the rehydrated milk replacer ranges from about 10 weight percent to about 20 weight percent, based on the total weight of the rehydrated milk replacer.

54. A method of producing a milk replacer product, the method comprising:

placing a powdered nutritional composition in a mixer;

applying an agglomerating aid and an emulsifying agent to the powdered nutritional composition in the mixer;

agglomerating the powdered nutritional composition in the mixer to produce the milk replacer product, wherein:

the milk replacer product, when rehydrated at the ratio of 100 grams of the milk replacer product to 350 milliliters of water and allowed to rest for at least about 60 minutes, exhibiting about 6 volume percent or less of fat separation, based upon the total volume of the rehydrated milk replacer product;

the concentration of fat in the milk replacer product ranges from about 25 weight percent to about 52 weight percent, based on the total weight of the milk replacer product; and the concentration of total solids in the rehydrated milk replacer product ranges from about 10 weight percent to about 20 weight percent, based on the total weight of the rehydrated milk replacer product.

55. The method of claim 54 wherein the pattern of air flow is created by a rotatable mixing shaft that extends into the mixer.

56. A method of producing a milk replacer product, the method comprising:

feeding a powdered nutritional composition into a mixing zone of a mixer;

creating a pattern of air flow in the mixing zone, the pattern of air flow created separately from the feeding of the powdered nutritional composition into the mixing zone;

applying an agglomerating aid to the particles of the powdered nutritional composition in the mixing zone, the agglomerating aid, in combination with the pattern of air flow, effective to cause particles of the powdered nutritional composition to stick together and form agglomerates; and drying or cooling the intermediate mixture to form the milk replacer product.

57. The method of claim 56 wherein the pattern of air flow is created by a rotatable mixing shaft that extends into the mixer.

58. A method of agglomerating a powdered nutritional composition, the method comprising:

dispersing an agglomerating agent, an emulsifying agent, and particles of the powdered nutritional composition in a region of agitated air flow within a mixing apparatus, the region of agitated air flow created separately from introduction of the powdered nutritional composition into the mixing apparatus; and coating particles of the powdered nutritional composition with the agglomerating agent and the emulsifying agent, the agitated air flow effective to agglomerate the coated particles and create particles of an intermediate mixture.

* * * * *